(12) United States Patent
Caplan

(10) Patent No.: US 7,414,728 B2
(45) Date of Patent: Aug. 19, 2008

(54) RECONFIGURABLE POLARIZATION INDEPENDENT INTERFEROMETERS AND METHODS OF STABILIZATION

(75) Inventor: David O. Caplan, Westford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 233 days.

(21) Appl. No.: 11/318,255

(22) Filed: Dec. 23, 2005

(65) Prior Publication Data
US 2006/0274320 A1    Dec. 7, 2006

Related U.S. Application Data

(60) Provisional application No. 60/639,183, filed on Dec. 23, 2004.

(51) Int. Cl.
*G01B 9/02* (2006.01)
(52) U.S. Cl. .................................................... 356/477
(58) Field of Classification Search ............... 356/477, 356/479, 497; 250/227.19, 227.27; 385/12
See application file for complete search history.

(56) References Cited

U.S. PATENT DOCUMENTS

| | | | |
|---|---|---|---|
| 6,396,605 | B1 | 5/2002 | Heflinger et al. |
| 6,559,946 | B2 * | 5/2003 | Davidson et al. ............ 356/450 |
| 6,924,894 | B2 * | 8/2005 | Hoult et al. .................. 356/477 |
| 2003/0123781 | A1 | 7/2003 | Rockwell et al. |
| 2004/0120629 | A1 | 6/2004 | Han et al. |
| 2004/0258423 | A1 | 12/2004 | Winzer |

FOREIGN PATENT DOCUMENTS

| | | |
|---|---|---|
| EP | 1 517 462 A2 | 3/2005 |
| WO | WO 02/091645 A1 | 11/2002 |

OTHER PUBLICATIONS

Xu, Chris, et al., "Differential Phase-Shift Keying for High Spectral Efficiency Optical Transmissions," *IEEE Journal of Selected Topics in Quantum Electronics*, 10(2), 281-293 (2004).

(Continued)

*Primary Examiner*—Michael A Lyons
(74) *Attorney, Agent, or Firm*—Hamilton, Brook, Smith & Reynolds, P.C.

(57) ABSTRACT

A polarization independent (PI) interferometer design that can be built from standard optical components is described. Based upon a Michelson interferometer, the PI interferometer uses a 50/50 splitter and Faraday Rotator Mirrors (FM's). The interferometer achieves good optical characteristics, such as high extinction ratio (ER) and low insertion loss (IL). Lack of polarization sensitivity reduces interferometer construction tolerances and cost, enhances performance and utility, and expands the scope of interferometric based devices. Such characteristics can be used to construct flexible, high performance, polarization insensitive, multi-rate, self-calibrating, optical DPSK receivers, power combiners, optical filters and interleavers, all-optical switches, and cascaded interferometers. Since polarization is not maintained in standard fiber optic networks, a PI-DPSK receiver allows for use of more sensitive DPSK communications over fiber, without need for costly polarization control hardware. Other applications of PI interferometers include optical CDMA, secure communications, optical coherence tomography (OCT), and temporal gratings with ultra-precise timing.

45 Claims, 33 Drawing Sheets

OTHER PUBLICATIONS

Kim, Hoon, "Cross-Phase-Modulation-Induced Nonlinear Phase Noise in WDM Direct-Detection DPSK Systems," *Journal of Lightwave Technology*, vol. 21, No. 8, 1770-1774 (Aug. 2003).

Rhee, J.K., et al., "DPSK 32×10 Gb/s Transmission Modeling on 5×90 km Terrestrial System," *IEEE Photonics Technology Letters*, vol. 12, No. 12, 1627-1629 (Dec. 2000).

Rohde, M., et al., "Robustness of DPSK Direct Detection Transmission Format in Standard Fibre EDM Systems," *Electronics Letters*, vol. 36, No. 17, 1483-1484, (Aug. 2000).

Spellmeyer, N.W., et al., "High-Sensitivity 40-Gb/s Rz-DPSK With Forward Error Correction." *IEEE Photonics Technology Letters*, vol. 16, No. 6, 1579-1581 (Jun. 2004).

Gnauck, A.H., et al., "Demonstration of 42.7-Gb/s DPSK Receiver with 45 Photons/Bit Sensitivity," *IEEE Photonics Technology Letters*, vol. 15, No. 1, 99-101 (Oct. 2003).

Hung, W., et al., "An Optical Network Unit for WDM Access Networks with Downstream DPSK and Upstream Remodulated OOK Data Using Injection-Locked FP Laser," *IEEE Photonics Technology Letters*, v. 15, No. 10, 1476-1478, (Oct. 2003).

Gnauck, A.H., et al., "25×40-Gb/s Copolarized DPSK Transmission Over 12×100-km NZDF With 59-Ghz Channel Spacing," *IEEE Photonics Technology Letters*, vol. 15, No. 3, 467-469 (Mar. 2003).

Leng, L., et al., "1.6 Tb/s(40×40 Gb/s) Transmission Over 500 km of Nonzero Dispersion Fiber with 100-km Amplified Spans Compensated by Extra-High-Slope Dispersion-Compensating Fiber," In Proc. OFC 2002 (2002).

Liu, F., et al., "1.6 Tbit/s (40×42.7 Gbit/s) Transmission Over 3600 km UltraWave™ Fiber with all-Raman Amplified 100 km Terrestrial Spans Using ETDM Transmitter and Receiver," in Proc. OFC 2002, (2002).

Rasmussen C., et al. "DWDM 40G Transmission Over Trans-Pacific Distance (10,000 km) Using CSRZ-DPSK, Enhanced FEC and All-Raman Amplified 100 km UltraWave™ Fiber Spans," in Proc. OCIA 2003 (2003).

Vassilieva, O., et al., "Numerical Comparison of NRZ, CS-RZ and IM-DPSK Formats in 43Gbit/s WDM Transmission," in Proc. LEOS 14th Annual Meeting, (2001).

Yonenaga, K., et al., "10-Gbit/s x Four-Channel WDM Transmission Experiment Over 2400-km DSF Using Optical DPSK Direct Detection Scheme," in Proc. OFC 97, 332-332. (1997).

Atia, W.A., and Bondurant, R.S., "Demonstration of Return-to-Zero Signaling in Both OOK and DPSK Formats to Improve Receiver Sensitivity in an Optically Preamplified Receiver," in Proc. LOES 12th Annual Meeting, vol. 1, 226-227 (1999).

Caplan, D.O., et al., "Performance of High-Rate High-Sensitivity Optical Communications with Forward Error Correction Coding," CLEO, CPDD9, May 2004.

Gnauck, A.H., et al., "2.5 Tb/s (64×42.7 Gb/s) Transmission Over 40×100 km NZDSF Using RZ-DPSK Format and All-Raman-Amplified Spans," in Proc. OFC, 2002.

Zhu, B., et al., "72-nm Continuous Single-Band Transmission of 3.56 Tb/s (89×42.7 Gb/s) Over 4000 km of NZDF Fiber," in Proc. OFC 2002 (2002).

Grosz, D.F., et al., "5.12 Tb/s (128×42.7 Gb/s) Transmission with 0.8 bit/s/Hz Spectral Efficiency Over 1280 km of Standard Single-Mode Fiber Using All-Raman Amplification and Strong Signal Filtering," in Proc. ECOC 2002, Postdeadline paer PD4.3, (2002).

Charlet, G., et al., "6.4 Tb/s (159×42.7Bg/s) Capacity Over 21×100 km Using Bandwidth-Limited Phase-Shaped Binary Transmission," in Proc. ECOC 2002, Postdeadline Paper PD4.1, (2002).

Zhu, B., et al., "Transmission of 3.2 Tb/s (80×42.7 Gb/s) Over 5200 km of UltraWave™ Fiber with 100-km Dispersion-Managed Spans Using RZ-DPSK Format," in Proc. ECOC 2002, Postdeadline Paper PD4.2, (2002).

Swanson, E.A., et al., "High Sensitivity Optically Preamplified Direct Detection DPSK Receiver with Active Delay-Line Stabilization," *IEEE Photonics Technology Letters*, vol. 6, No. 2, 263-265 (Feb. 1994).

* cited by examiner

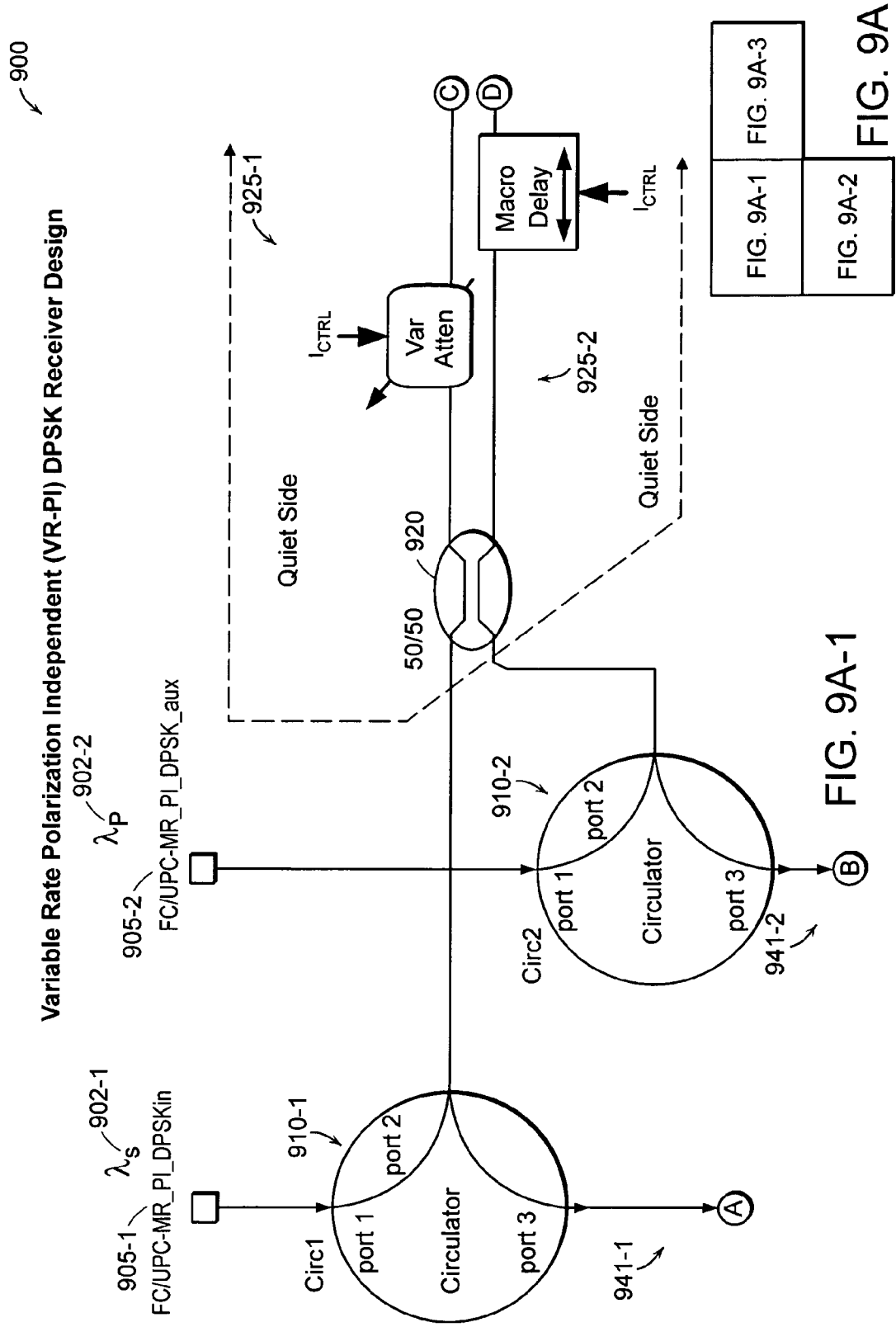

990

Length of Fiber: $L = \dfrac{c * \Delta t}{n * 2}$
(through double-pass)
c = speed of light = 3.0 x 10E8 m/s
Δt = time delay
n = refractive index of fiber = 1.4644 for SMF28
2 = # of passes through the fiber
=> ~0.1 mm fiber = 1psec or 9.76psec = 1mm

| FM | Relative Lengths, [mm] | Q | SWITCH MATRIX R | S | T | U |
|---|---|---|---|---|---|---|
| | | | | | | Angle |
| A | 82.38 | 82.38 | 64.66 | 654.64 | 9293.18 | |
| B | 164.66 | 0.00 | 42.88 | -76.31 | -3210.85 | |
| C | 325.32 | 82.33 | 0.00 | -438.99 | -3128.82 | |
| D | 1317.27 | 245.99 | 164.00 | -329.32 | -2965.95 | |
| E | angle | 12847.94 | 1192.61 | 956.64 | -1575.91 | |

FIG. 9B

SWITCH MATRIX

| FM | Relative Lengths, [mm] | Q | R | S | T | U |
|---|---|---|---|---|---|---|
| | | 82.33 | 164.66 | 2716.87 | 5862.52 | Angle |
| A | 164.66 | 82.33 | 0.00 | -2552.21 | -5697.86 | |
| B | 329.32 | 246.99 | 164.66 | -2387.55 | -5533.20 | |
| C | 493.98 | 411.65 | 329.32 | -2222.90 | -5368.54 | |
| D | 740.97 | 658.64 | 576.31 | -1975.91 | -5121.55 | |
| E | Angle | | | | | |

| Sorted list of lengths, times, and frequencies | | |
|---|---|---|
| [mm] | dT, [psec] | df, [MHz] |
| 0.00 | 0.00 | na |
| 82.33 | 803.8 | 1244.160 |
| 164.66 | 1607.5 | 622.080 |
| 246.99 | 2411.3 | 414.720 |
| 329.32 | 3215.0 | 311.040 |
| 411.65 | 4018.8 | 248.832 |
| 576.31 | 5626.3 | 177.737 |
| 658.64 | 6430.0 | 155.520 |
| 1975.91 | 19290.1 | 51.840 |
| 2222.90 | 21701.4 | 46.080 |
| 2387.55 | 23308.9 | 42.902 |
| 2552.21 | 24916.4 | 40.134 |
| 5121.55 | 50000.0 | 20.000 |
| 5368.54 | 52411.3 | 19.080 |
| 5533.20 | 54018.8 | 18.512 |
| 5697.86 | 55626.3 | 17.977 |

FIG. 10C

RECONFIGURABLE POLARIZATION INDEPENDENT INTERFEROMETERS AND METHODS OF STABILIZATION

RELATED APPLICATION(S)

This application claims the benefit of U.S. Provisional Application No. 60/639,183, filed on Dec. 23, 2004. The entire teachings of the above application are incorporated herein by reference.

GOVERNMENT SUPPORT

The invention was supported, in whole or in part, by a grant F19628-00-C-0002 from the United States Air Force. The Government has certain rights in the invention.

BACKGROUND OF THE INVENTION

Optical interferometers are used in optical receivers to receive optical communications signals, such as Differential Phase Shift Keyed (DPSK) modulation signals, which carries differentially encoded data on the phase of an optical signal in time. DPSK provides approximately 3 dB sensitivity improvement over commonly used intensity modulation (IM) formats, such as On Off Keying (OOK). It also can operate with a 100% duty-cycle, in contrast to the IM formats which typically have a maximum 50% duty-cycle. Therefore, DPSK can transmit the same average power with one-half the power peak power of OOK, which can reduce nonlinear effects that can often limit the capacity of fiber-optic links. Such performance benefits come at the cost of increased complexity in the receiver, which requires a delay-line interferometer.

For optical communication systems, the interferometer is often polarization sensitive, requiring control of (i) incoming polarization and (ii) relative polarization and phase between the arms of the interferometer. Typical DPSK systems encode the binary digital data by sending bits with either a 0 or $\pi$ differential phase shift, where no phase shift maps to a logical "zero" and the $\pi$ phase shift can map to a logical "one." The $\pi$ phase shift corresponds to a half wavelength ($\lambda/2$) delay, which, for 1.5 µm wavelength optical signals, corresponds to about a 500 nm shift in distance in fiber or, equivalently, 2.5 fs in time. The interfering bits are usually adjacent to each other, so that the delay between them, $\tau$, is the same as the bit period, and dependent on the data rate. For example, for data rate R=40 Gbit/s communications, $\tau=1/R=25$ psec, or approximately 10,000 half-wavelengths; for data rate R=10 Gbit/s communications, $\tau=1/R=100$ psec, or approximately 40,000 half-wavelengths.

In order to demodulate optical DPSK signals, the differentially encoded bits are interfered with each other. This is typically achieved using the Mach-Zehnder type delay-line interferometer, where the delay is the time duration $\tau$ between the differentially encoded bits. In order maximize the interference, the two interfering bits must have substantially the same polarization, and the delay and the differential delay must be stable to small fractions of a wavelength (e.g., $<\lambda/10=\sim 100$ nm in fiber or 0.5 fs). Due to these challenging constraints, existing delay-line interferometers often incorporate a microscopic phase control element that can impart fractional wavelength delays on the optical path by heating or stretching the fiber/waveguide, which, in conjunction with feedback, can be used to stabilize the interferometer. In addition, existing delay-line interferometers often make use of polarization maintaining elements or active polarization control, and minimize the use standard single-mode elements in order to improve stability.

SUMMARY OF THE INVENTION

One embodiment of the present invention comprises an interferometer or corresponding method. One embodiment of the interferometer comprises (i) an optical insertion element receiving at least one optical signal, (ii) a splitter optically coupled to the insertion element that splits the at least one optical signal in a forward direction onto multiple optical paths and interferes the optical signal in a reverse direction from the multiple optical paths, (iii) at least one direction changing element coupled to the splitter by respective optical paths causing the optical signal to travel in the reverse direction on the respective optical paths, (iv) a polarization rotation element in at least one of the multiple optical paths configured to rotate the optical signal to a polarization in the reverse direction orthogonal to the polarization in the forward direction; and (v) a given optical element, in at least one of the multiple optical paths, configured to apply an optical function to the at least one optical signal other than a delay corresponding to a fraction of a carrier wavelength of the at least one optical signal.

The given optical element may be a delay element that adds a path delay of at least one psec. The interferometer may further include a microscopic delay element that delays the optical signal passing therethrough with a resolution of a fraction of a carrier wavelength of the optical signal.

The given optical element may introduce a dither into a respective optical path, or another element, such as a piezo-electric actuator connected to the at least one direction changing element, may introduce a dither into a respective one of the multiple optical paths. The given optical element may cause a gain or loss to the optical signal on the respective optical path.

The given optical element may selectably terminate the interference, in which case, the interferometer may further include a processor that causes the given optical element to terminate the interference, characterizes elements in the interferometer, and calibrates the interferometer through use of the at least one reconfigurable, macroscopic, optical element.

The given optical element may include at least one of the following elements in at least one of the multiple optical paths: an amplifier, attenuator, band-pass filter, band-reject filter, notch filter, comb filter, pulse shaper, specialty fiber, nonlinear optical element, dispersion compensating element, direction independent modulator, direction dependent modulator, optical delay element, optical switch, wavelength converter, pump coupling element, interleaver, or wavelength division multiplexer.

In one embodiment, the given optical element may include an optical gain medium in the multiple optical paths, the multiple optical paths between the Faraday mirror and optical gain medium being loss insensitive regions, wherein the given optical element is disposed in respective loss insensitive regions.

The given optical element may include an optical switching element. The given optical element may be adjustable in a manner accommodating multiple lengths of overhead or payload or data rates of optical DPSK signals.

In one embodiment, the optical insertion element, splitter, and optical element are single-mode optical elements. In another embodiment, these elements are multi-mode optical elements.

In some embodiments, the interferometer includes another splitter configuring another interferometer in at least one of the optical paths. The optical insertion element may be a beam splitter, polarization beam splitter, or circulator. The interferometer may support a carrier wavelength, a pilot tone, or plurality of pilot tones.

The at least one direction changing element and polarization rotation element may form a Faraday mirror. The at least one direction changing element and the polarization rotation element may be the same element.

The optical signal may be a differential phase shift keying (DPSK) signal.

The interferometer may be configured to perform Optical Coherence Tomography (OCT) by including a device under test optically disposed in at least one of the multiple optical paths.

An optical receiver may include the interferometer according to any of the aforementioned embodiments and also include an optical detector coupled to outputs of the interferometer and a controller causing the given optical element to be reconfigured based on optical signals detected by the optical detector.

In some applications, the interferometer interferes orthogonally polarized, differentially encoded light. The interferometer may further include a tuner that causes the interferometer to tune to the at least one optical signal or a different received optical signal.

Another embodiment of the present invention is an interferometer, or corresponding method, with (i) at least one port configured to receive at least one optical signal or at least one optical pilot tone, the at least one pilot tone being a non-harmonic of the at least one optical signal, and (ii) at least one element configured to distinguish the at least one optical pilot tone from the at least one optical signal.

In this embodiment, the optical pilot tone may be displaced in wavelength from the optical signal by a substantial portion of a free spectral range (FSR) of the interferometer as defined by the periodicity of the interferometer. Further, the at least one optical pilot tone and at least one optical signal may propagate in opposite directions in the interferometer. The pilot tone may be displaced in wavelength less than a harmonic of the at least one optical signal.

The at least one optical pilot tone may be distinguished from the at least one optical signal distinguishing based on at least one of the following: direction, angle, wavelength, polarization, modulation, or lack of modulation.

The interferometer may further include an optical element that tunes the at least one optical signal based on the at least one optical pilot tone. In one embodiment, the interferometer includes a controller that tunes the at least one pilot optical pilot tone based on the at least one optical signal.

Yet another embodiment of the present invention includes tuning an interferometer to a wavelength of at least one optical signal based on at least one pilot tone in an absence of the at least one optical signal at a level sufficient for tuning the interferometer.

BRIEF DESCRIPTION OF THE DRAWINGS

FIG. 9B is a table and mathematical equations related to the embodiment of FIG. 9A;

FIGS. 10A-10C include a plot and corresponding tables representing a range of operation of an embodiment of the polarization independent interferometer;

DETAILED DESCRIPTION OF THE INVENTION

A description of preferred embodiments of the invention follows.

Figure 1A:
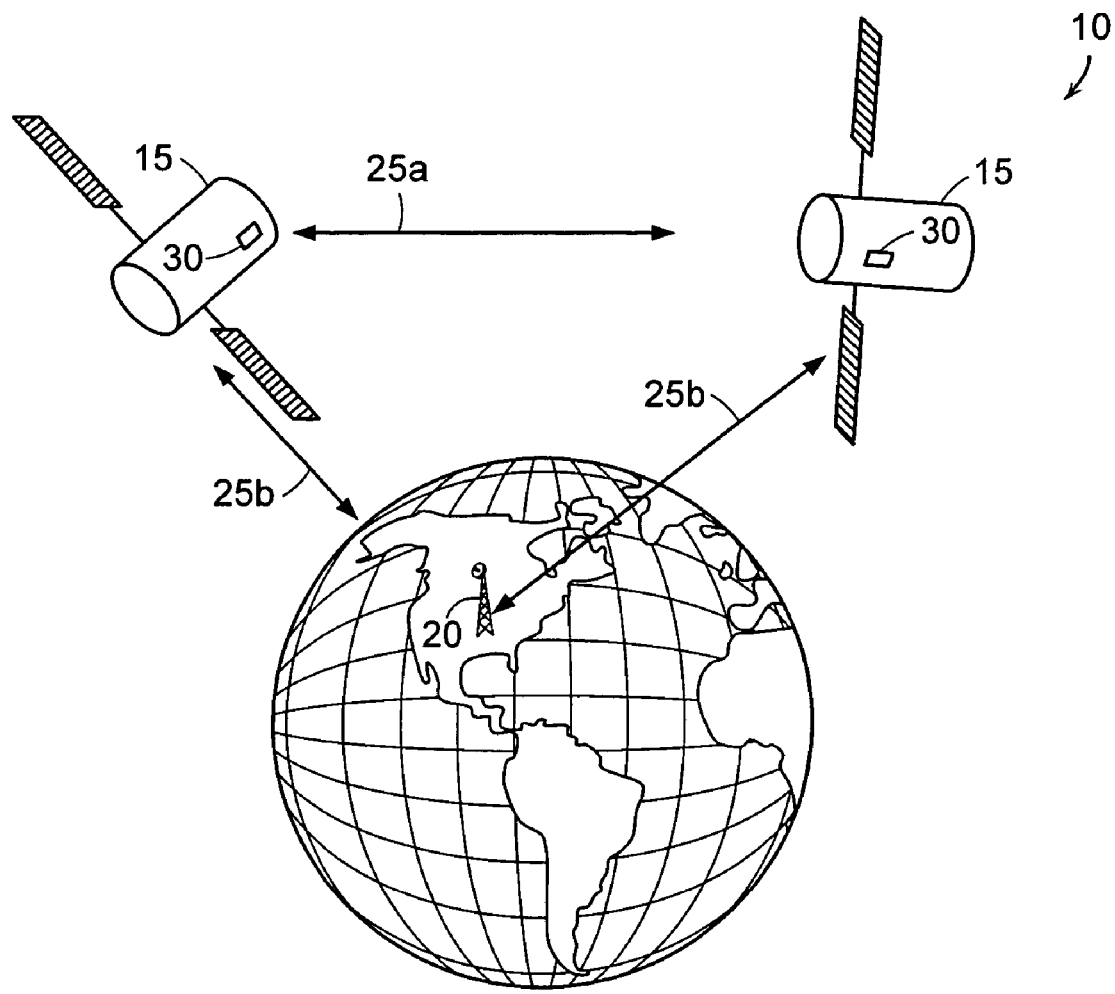
FIG. 1A is a perspective view of an optical inter-satellite communications system 10 employing an embodiment of the present invention.

FIG. 1A is a perspective view of an optical inter-satellite communications system 10 employing an embodiment of the present invention. The optical inter-satellite communications system 10 includes at least two satellites 15 in communication with each other and with a ground station 20. The satellites may employ optical communications to send and receive data that may be relayed to another satellite 25a, or utilized by the satellite. The data may include pointing, acquisition and tracking (PAT) information, positioning information, attitude information, diagnostic static checks, or other functions, or data to be retransmitted. Each of the satellites 15 includes an optical transceiver, which utilizes an optical interferometer 30.

Figure 1B:
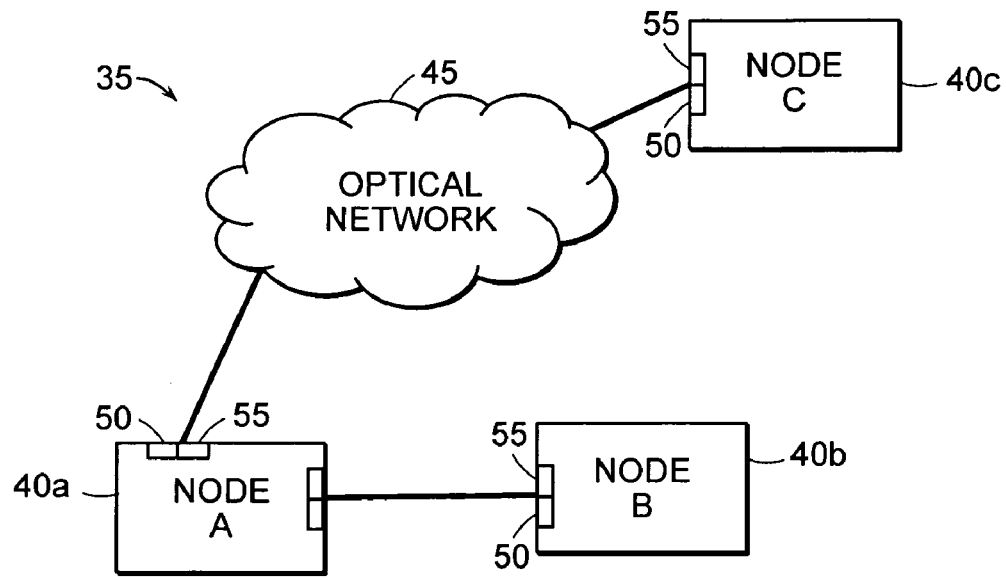
FIG. 1B is a network diagram of a ground-based optical communications system 35 employing an embodiment of the present invention.

FIG. 1B is a network diagram of a ground-based optical communications system 35 employing an embodiment of the present invention. The optical communications system 35 includes optical network nodes 40a, 40b, and 40c, and includes an optical network 45, across which optical signals are transmitted between nodes A and C. Each of the network nodes 40a-c includes an optical transceiver 50 with an optical interferometer 55 according to an embodiment of the present invention.

In one embodiment, the optical interferometers of FIGS. 1A and 1B demodulate Differential Phase Shift Keying (DPSK) communications signals. Such signals may be used for Synchronous Optical Network (SONET) communications protocol signals.

Figure 1C:
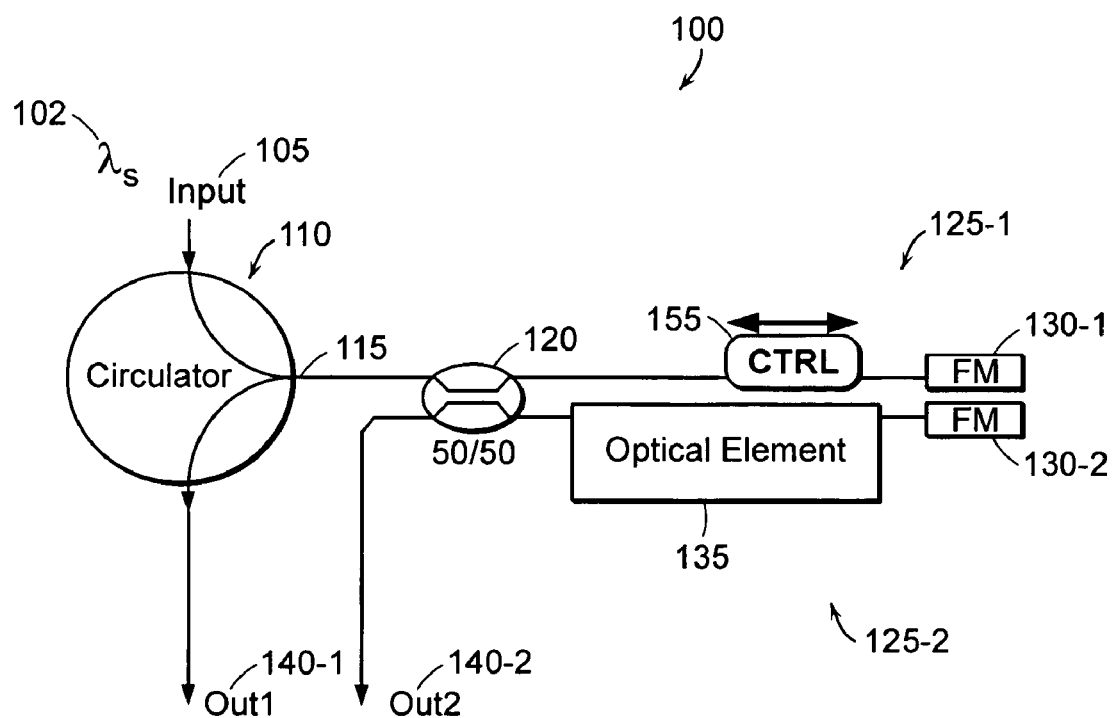
FIG. 1C is a schematic diagram of a polarization insensitive Michelson interferometer according to an embodiment of the present invention.

FIG. 1C is a reconfigurable polarization independent (PI) interferometer 100 according to an embodiment of the present invention. The interferometer 100 receives an optical signal 102 at an input port 105. The input port 105 directs the optical signal 102 into a circulator 110, or other optical element such as a Polarization Beam Splitter (PBS) or coupler, that directs the optical signal 102 in a forward direction on an Input/Output (I/O) optical path 115. A 50/50 splitter 120 is coupled to the circulator 110 via the I/O optical path 115. In this embodiment, to the right of the splitter 120 are first and second optical paths 125-1, 125-2 that carry the optical signal (i.e., 50% of the optical signal on each of the optical paths). A Faraday mirror 130-1, 130-2 is coupled to the optical paths 125-1, 125-2, respectively, in a manner causing the optical signal on each of the paths to travel in a reverse direction on the respective paths. The forward and reverse propagating signals on each of the paths are orthogonally polarized with respect to each other.

In the example interferometer of FIG. 1C, in one of the optical paths, such as the second optical path 125-2, is a reconfigurable, macroscopic optical element 135. The optical signal on the second optical path 125-2 passes through the single-mode optical element 135. The optical signals traveling in the reverse direction on the optical paths are interfered with each other at the splitter 120. Resulting optical signal(s) from the interfered optical signals are directed to output ports 140-1 and 140-2 of the interferometer 100.

The polarization independent interferometer 100 of FIG. 1C can be built from standard, single-mode, optical components. Based on a Michelson interferometer design, the interferometer according to embodiments of the present invention may use a single 50/50 splitter and Faraday rotator mirrors (FM's) or other direction and polarization elements changing elements, in contrast to a Mach-Zehnder interferometer design, which uses two matched 50/50 splitters and polarization control. The Michelson interferometer embodiment simplifies the design and inability to achieve good optical characteristics, such as high extinction ratio (ER) and low insertion loss (IL). Lack of polarization sensitivity can reduce interferometer construction tolerances and costs, enhance performance and utility, and expand scope of interferometer-based devices.

For example, such characteristics can be used to construct flexible, high performance, polarization insensitive (multi-rate, self-calibrating) optical DPSK receivers, power combiners, optical filters or interleavers, all-optical switches, and multi-pass and cascaded interferometers—all based on inexpensive standard components. Since polarization is not maintained in standard fiber optic networks, a PI-DPSK receiver allows for the use of more sensitive DPSK communications over fiber without a need for costly polarization control hardware or polarization diversity techniques. Other applications of PI interferometers include optical Code Division Multiple Access (CDMA), secure communications, Optical Coherence Tomography (OCT), and temporal gratings with ultra-precise timing.

The polarization insensitive interferometer may be used as part of an optical DPSK communications receiver. The interferometer may be employed to simplify design of fiber-based or free-space DPSK systems, or may be applied to other communications modulation formats. The PI interferometer removes polarization dependence and birefringence concerns in both fiber-based and integrated systems. It also enables optical communications modulation formats, such as DPSK, to be used in links where polarization is not easily controlled (e.g., terrestrial fiber networks). This, in turn, may provide potential improvements in receiver sensitivity and reduction of nonlinear impairments. The PI interferometer may also enable adaptable receivers using a Commercial Off-The-Shelf (COTS) or customized hardware.

There may be several functions performed using the PI interferometer. These functions may include one or a combination of the following: pilot tone alignment, power combining, optical filtering or interleaving, optical coherence tomography, multi-pass and cascaded interferometry, and secure communications. The multi-pass and cascaded interferometry may offer high extinction ratio, narrow filtering, or temporal gratings with ultra-precise spacing and apodization. These example functions are discussed below in reference to the various figures.

The PI interferometer may include yet other features. For example, the PI interferometer's inherent lack of polarization dependence may relax production tolerances and remove potential long term degradation impact of polarization wander in polarization sensitive designs. This means that the PI interferometer can use standard components without concern for polarization stability or maintaining properties. This also means that the PI interferometer may include useful optical elements, such as gain, loss, filtering, nonlinear elements, delay lines, phase, amplitude modulating elements, or combinations thereof.

Another example feature of the PI interferometer is optional use of variable tuning elements. For example, the variable tuning elements may include standard switching elements to switch in or out, variable delay line elements that can be used to extend the interferometer differential time delay ($\Delta\tau$) or its reciprocal, the Free Spectral Range (FSR), over a wide dynamic range of operation (e.g., from KHz rates to hundreds of GHz rates). The variable delay elements may facilitate construction, since the variable capability can be used to trim out-of-tolerance delays, and may also provide an ability to tune the interferometer to a particular frequency, which may be useful, for instance, in compensating for Doppler shift or changing data rates.

Variable attenuators may be used to optimize extinction ratio, which can relax construction and procurement tolerances on other elements within the interferometer, or may be used simply to compensate for elements if they degrade.

Other features in the PI interferometer in some embodiments make use of dual inputs. For DPSK, for example, one input can be used as a spare, optionally used for control, pilot tone insertion, built-in test, or auto-calibration. The dual inputs can be used as an interleaver or Wavelength Division Multiplexing (WDM) combiner inputs that can be tuned, reconfigured, or reoptimized.

Other embodiments of the PI interferometer, or corresponding methods, includes built-in test and auto-calibration features. For example, each arm of the reconfigurable interferometer may be independently extinguished (i.e., $R \rightarrow 0$), either by an attenuator or by a terminated switch port with high return loss. When all but one interferometer arm is extinguished (OFF) and one interferometer arm is ON (i.e., reflecting optical power), there is no interference. This allows for straightforward characterization of the reflecting arm(s) and coupler splitting ratios, and balancing of output signals. The latter can be achieved by reflecting the input power off a single reflector to balance an output arm attenuator so that the power in the output arms (or received by subsequent detectors) attain a desired ratio, which is ideally 1:1 for the case of DPSK. For the case of photodetectors with different detection efficiencies, the desired ratio may be some other ratio that balances photodetector current rather than optical power. Another auto-calibration feature may include switching the single ON arm to the other arm of a 2-arm interferometer setup to generate another measurement of the outputs, which now include the net reflectivity from the second arm.

Still another example of an auto-calibration feature in another embodiment of the present invention includes a splitter with split ratio R:T (ideally R=T=0.50, R:T=50:50), and net reflections $R_1$ and $R_2$, which return from arm1 (125-1) and arm2 (125-2) of the interferometer, respectively, (i) when $R_2$ is terminated, i.e., $R_2$=0: Out1=$T^2R_1$, Out2=$TRR_1$ and (ii) when R1=0: Out1=$R^2 R_2$, Out2=$TRR_2$. These two measurement sets yield the following relations: Out2($R_2$=0)/Out2 ($R_1$=0)=$R_1/R_2$; Out1 ($R_2$=0)/Out2($R_2$=0)=T/R; Out1($R_1$=0)/Out2 ($R_1$=0)=R/T. These relationships provide current information on (a) a splitting ratio (R:T), which places fundamental limits on the interferometer extinction ratio (ER); and (b) net reflectivities ($R_1$ and $R_2$ in this example) of each interferometer arm, which may be tuned via variable attenuators, or an equivalent to optimize the performance.

The PI interferometer design of the various embodiments of the present invention enables built-in testing, diagnostics, auto-calibration, tunability, and flexible reconfiguration, which can be used to optimize performance for a given application.

The PI interferometer may be applied to Differential Phase Shift Keying (DPSK) modulation signals. Because of its usefulness to DPSK modulation, some specific mention of the PI interferometer application to DPSK is now presented.

DPSK is a modulation format that provides approximately 3 dB sensitivity improvement over intensity modulation (IM) formats, such as On Off Keying (OOK) and binary Pulse Position Modulation (PPM). DPSK can also operate with a 100% duty cycle, in contrast to the IM formats, which have a maximum 50% duty cycle. Therefore, DPSK can transmit the same average power with two times (2×) lower peak power. This can reduce nonlinear effects, which can often limit the capacity of fiber-optic links. Such performance benefits come at a cost of increased complexity in the receiver, which requires a one-byte delayed line interferometer.

For optical communications systems, the interferometer is often polarization sensitive, requiring control of both incoming polarization then relative phase and polarization between the two arms on the interferometer. Usually, the interferometer is a Mach-Zehnder (MZ) type, composed of two 50/50 beam splitters with the appropriate differential delay. Construction of such an interferometer with good optical characteristics, such as high contrast ratio or extinction ratio (ER) can be challenging since it requires two matched 50/50 splitters and a means of maintaining polarization alignment between them. Extending this design type to operate at multiple rates can be complex, requiring switching between N-different interferometers to operate at N-different rates or construction of a multi-rate MZ interferometer, which requires 2N switches to change relative arm lengths within the interferometer. In this case, in order to maintain good interference, either polarization control must be employed or the 2N switches and connecting optical paths all must maintain polarization. Polarization control is an expensive option, and the polarization maintaining option is difficult to achieve in practice, especially over a range of environmental conditions over an extended, approximately 20-plus year lifetime.

A PI interferometer according to embodiments of the present invention enables a use of DPSK over both polarization preserving channels, such as free links, and polarization scrambling channels, such as optical fiber links, without a need for polarization control. As shown in the accompanying figures, the PI interferometer design according to embodiments of the present invention can be extended to provide a flexible, reconfigurable, multi-rate, DPSK interferometer. It should be understood that the PI interferometer according to embodiments of the present invention can be designed to operate with other forms of modulation.

Figure 2:
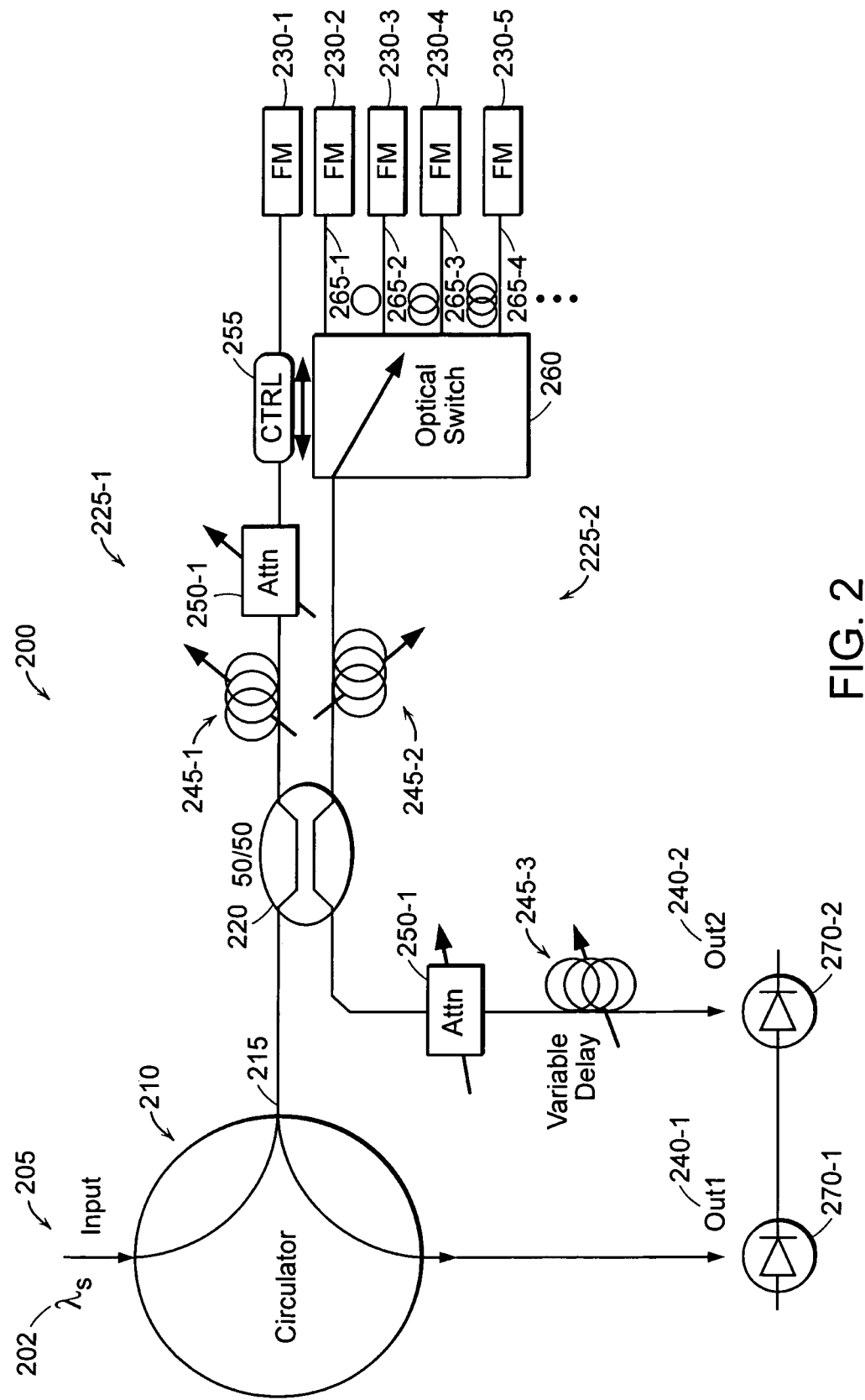
FIG. 2 is a schematic diagram of a polarization insensitive reconfigurable interferometer that can be used as part of a multi-rate (MR) Differential Phase Shift Keying (DPSK) receiver using an embodiment of the interferometer of FIG. 1.

FIG. 2 is a schematic diagram of an example PI multi-rate (MR) DPSK receiver 200 employing embodiments of the present invention. The receiver 200 combines polarization independence with reconfigurability. The reconfigurability allows the interferometer to switch between different DPSK bit rates, bit-interleave times, or free spectral ranges (FSR's). The interferometer 200, in one embodiment, uses a single interfering element 220 (e.g., 50/50 splitter or other ratio), in contrast to commonly used Mach-Zehnder designs that require two splitters, both with near 50/50 splitting ratios. The single interfering element 220 is useful for reducing manufacturing/component tolerances. In some embodiments, the interferometer elements (e.g., circulator 210, splitter 220, Faraday mirror 230-1, and so forth) are common to all rates. Reuse of these elements can significantly reduce component counts and assembly time of an N-arm multi-rate interferometer versus N-single rate interferometers. The reconfigurable multi-rate capability of an embodiment of the interferometer 200 can easily be implemented with a common set of detection electronics, in contrast with designs incorporating independent interferometers, which require additional switching elements.

Another way in which the example interferometer of FIG. 2 combines polarization independence with reconfigurability is in a manner of comparing bits of a DPSK signal. For a standard DPSK, interferometers compare phase of adjacent bits, but that is not a strict requirement. Non-adjacent bits can be used for differential phase encoding. With the embodiments of the present invention, the phase comparison interval can be varied dynamically, to compare, for example, adjacent bits or non-adjacent bits, such as every other bit, every third bit, every fourth bit, and so forth bits. This can be used to enhance security at the physical layer or to simplify detection electronics design.

Referring now to the details of the embodiment of FIG. 2, the DPSK receiver 200 has an interferometer section with optical elements 205-265, and also includes an opto-electronic section with optical detectors 270-1, 270-2, which are opto-electronic interfaces for receiver electronics (not shown). Referring to the interferometer section, the interferometer 200 includes an input 205 at which an optical signal 202 is received. The optical signal 202 is directed by a circulator 210 to an optical path 215 to which a 50/50 splitter 220 is coupled. The 50/50 splitter 220 substantially evenly splits the received optical signal 202 in a forward direction onto a first optical path 225-1 and a second optical path 225-2. The first optical path 225-1 includes an adjustable delay optical element 245-1, optical attenuator 250-1, optical control element 255 (e.g., fiber stretcher), and Faraday mirror 230-1. The second optical path 225-2 includes an optical delay element 245-2, optical switch 260, which is coupled to multiple optical paths 265-1, 265-2, 265-3, 265-4, and so forth. The optical paths 265-1 . . . 265-4 have different path lengths to allow the optical switch 260 to connect the optical signal 202 in the second optical path 225-2 to optical path lengths that may differ in multiple wavelengths of a carrier wavelength of the optical signal 292. Alternatively, some of the optical paths 265-1 . . . 265-4 can have the same path length to provide redundancy in case of component failure. At the other side of the optical paths 265-1 . . . 265-4 are Faraday Mirrors 230-2, 230-3, 230-4, 230-5, and so forth.

In operation, the optical signal 202 is split by the splitter 220 into two substantially equivalent optical signals, and the equivalent optical signals: travel in a forward direction in the optical paths 225-1, 225-2, pass through the optical elements (e.g., optical attenuator 250-1, optical switch 260, optical delay elements 245-1, 2), reflect off and are rotated in polarization by the Faraday Mirrors 230-1 . . . 5, (i.e., the optical signals are reflected and rotated by 90 degrees in polarization with respect to their polarization in the forward direction), and interfere with one another at the 50/50 splitter 220, which determines an intensity of light that exits via the output ports 240-1, 240-2. In this embodiment, the optical path between the splitter 220 and the second optical port 240-2 includes an optical attenuator 250-2 and variable delay optical element 245-3, which may be used to adjust the optical signal in the path in a manner for balancing with the optical signal to the first output optical port 240-1 at a given ON state.

Figure 3:
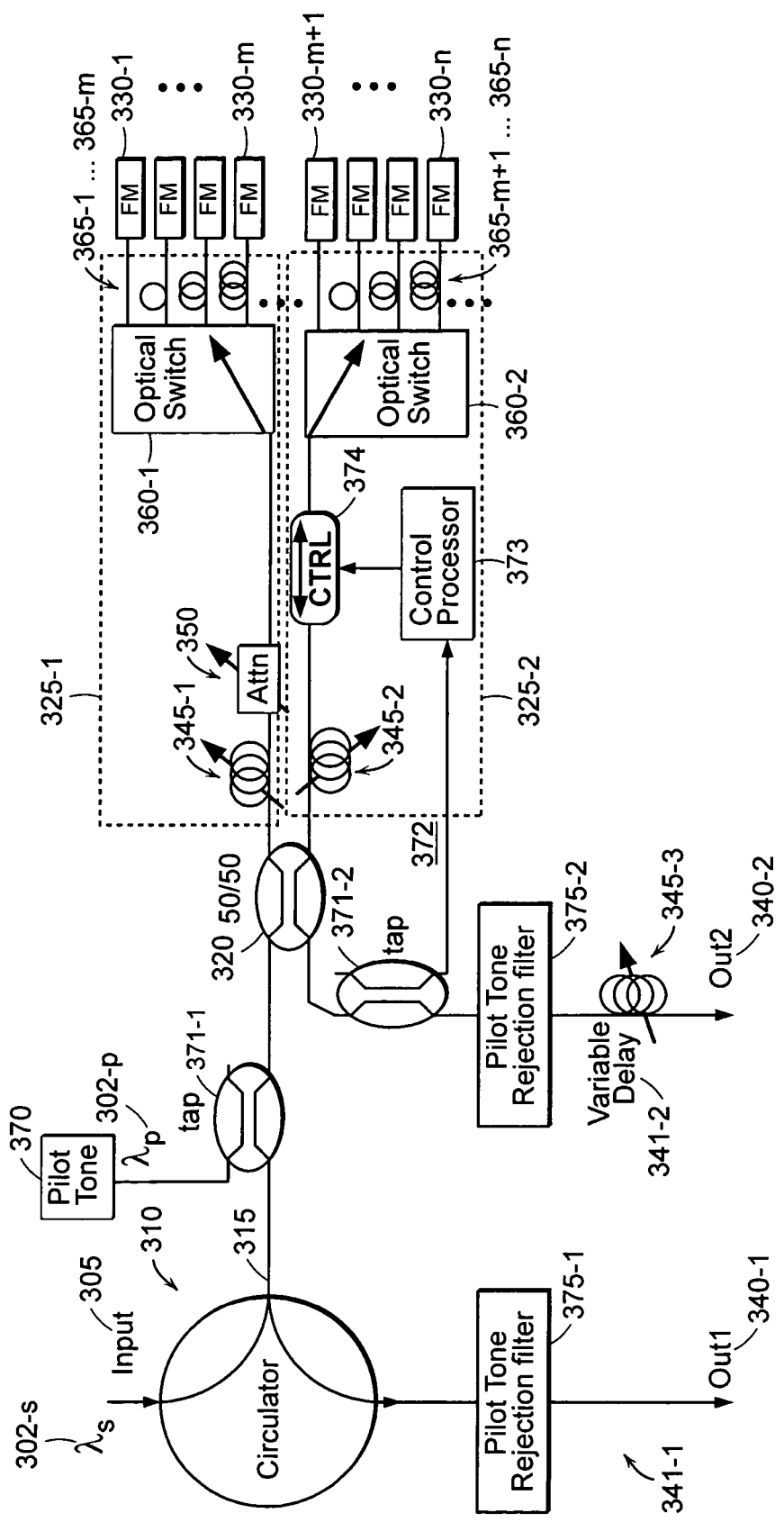
FIG. 3 is a schematic diagram of an interferometer employing pilot tone stabilization according to an embodiment of the present invention.

FIG. 3 is a schematic diagram of another embodiment of a present invention in which an optical interferometer 300 is configured to operate with pilot tone stabilization. Pilot tone stabilization refers to use of a pilot tone 302-$p$ reference signal output by a pilot tone generator 370, that can be used for stabilization or to lock the polarization independent interferometer (PII) 300 to a preselected wavelength. Since the transfer function of the interferometer is periodic, the tone 302-$p$ can be offset by an integer number of Free Spectral Ranges (FSR) to facilitate wavelength separation of the pilot tone 302-$p$ and input signal 302-$s$.

The control approach in this embodiment can either minimize or maximize the pilot tone, or target a predetermined ratio depending on the wavelength's of the signal and pilot tone and the interferometer FSR. The pilot tone output(s) can be tapped from either output 340-1, or 340-2. Minimizing the output from one arm is equivalent to maximizing the output from the other arm.

The residual pilot tone can be filtered from output ports 340-1, 340-2, if necessary with use of optional pilot tone rejection filters 375-1, 375-2.

Referring further to the schematic diagram of FIG. 3, an optical signal 302-$s$ is received at an input port 305. A circulator 310 directs the optical signal 302-$s$ onto an optical path 315. An optical tap, splitter, or WDM 371-1 optically couples a pilot tone 302-$p$ generated by pilot tone generator 370 onto the optical path 315 so that it is co-propagating with the optical signal 302-$s$ in a forward direction to a 50/50 beam splitter 320. The beam splitter 320 directs 50% of the optical signal 302-$s$ and the pilot tone 302-$p$ onto a first optical path 325-1 and second optical path 325-2. The optical signals in the first optical path 325-1 pass through reconfigurable, macroscopic, optical elements, namely, a variable optical delay element 345-1, optical attenuator 350, an optical switch 360-1. The optical switch 360-1 directs the optical signals to static optical delay lines 365-1 . . . 365-$m$, which have Faraday Mirrors 330-1 . . . 330-$m$ optically connected thereto. After passing through the macroscopic optical elements 345-1, 350, 360-1, 365-1 . . . 365-$n$ in a forward direction, the optical signals are rotated in polarization 90 degrees and reflected by the Faraday Mirrors 330-1 . . . 330-$m$ for traveling in the reverse direction along the first optical path 325-1 back to the 50/50 beam splitter 320.

Similarly, the optical signal 302-$s$ and pilot signal 302-$p$ pass through the 50/50 beam splitter 320 and travel in a forward direction in the second optical path 325-2. The second optical path 325-2 includes reconfigurable, macroscopic, optical elements, such as a variable optical delay 345-2, electrically controllable optical phase shifter or other control element 374, and optical switch 360-2 with static optical delay paths 365-$m$+1 . . . 365-$n$. Also similar to the first optical path 325-1, the second optical path 325-2 supports the optical signals in forward and reverse directions.

The 50/50 beam splitter 320 receives the optical signals in the reverse direction on the first and second optical paths 325-1, 325-2, and interferes the optical signals in a manner well understood in the art. Due to the orthogonally polarized reflections, the returning signal and pilot on both optical paths 325-1 and 325-2 incident on the 50/50 splitter 320 are orthogonal to the respective inputs. Therefore, the interfering signals are co-polarized with respect to each other, which maximizes the interference, without the need for polarization maintaining or controlling elements. The optical signal(s) resulting from the interference travel to the outputs ports 340-1, 340-2 via respective output arms 341-1 and 341-2. Each of these output arms 341-1, 341-2 includes a pilot tone rejection filter 375-1, 375-2. The second of the output arms 341-2 also includes a variable delay element 345-3, which can be used to address timing of the optical signal on the second output arm 341-2 with respect to the optical signal on the first output arm 341-1.

In this embodiment, the optical interferometer 300 includes pilot tone control through use of an optical tap 371-2, control processor 373, control element 374, which controls the pilot interference through a control loop 372. The control processor 373 may use any number of control techniques, such as optimal control, PID control, adaptive learning control, or other type of control, to stabilize the interferometer based on the pilot tone 302-$p$, in this embodiment. Furthermore, any of the known techniques, such as dithering the interferometer path length or the pilot wavelength, can be used in conjunction with the pilot tone signal to stabilize the interferometer. In addition, dither-free closed-loop control using a pilot tone can be achieved. Alternatively, the tap 371-2 can be chosen to pass the optical signal 302-$s$ to the control processor 373, which causes the interferometer 300 to be controlled based on the optical signal 302-$s$. Or, the control processor can accept signal feedback derived from the interferometer output ports 340-1 and 340-2.

In other embodiments, multiple taps and pilot signals may be used, and the control processor 373 may choose which of the optical signals to use to stabilize the interferometer. For example, in some cases, the optical signal 302-$s$ is used when the level of intensity of the optical signal 302-$s$ is sufficient to allow the control processor 373 to stabilize the interferometer in a suitable manner. In cases where the optical signal 302-s is below a level of intensity that can be used for the stabilization, the control processor 373 may alternatively use the pilot tone 302-p to stabilize the interferometer 300. Such reasons for using the pilot tone 302-p to stabilize the interferometer 300 include no optical signal, loss of optical signal, low level of optical signal intensity, fading conditions, and other possible reasons for having a reduction of optical intensity. Further details regarding the pilot tone control are presented below beginning in reference to FIG. 16.

Figure 4A:
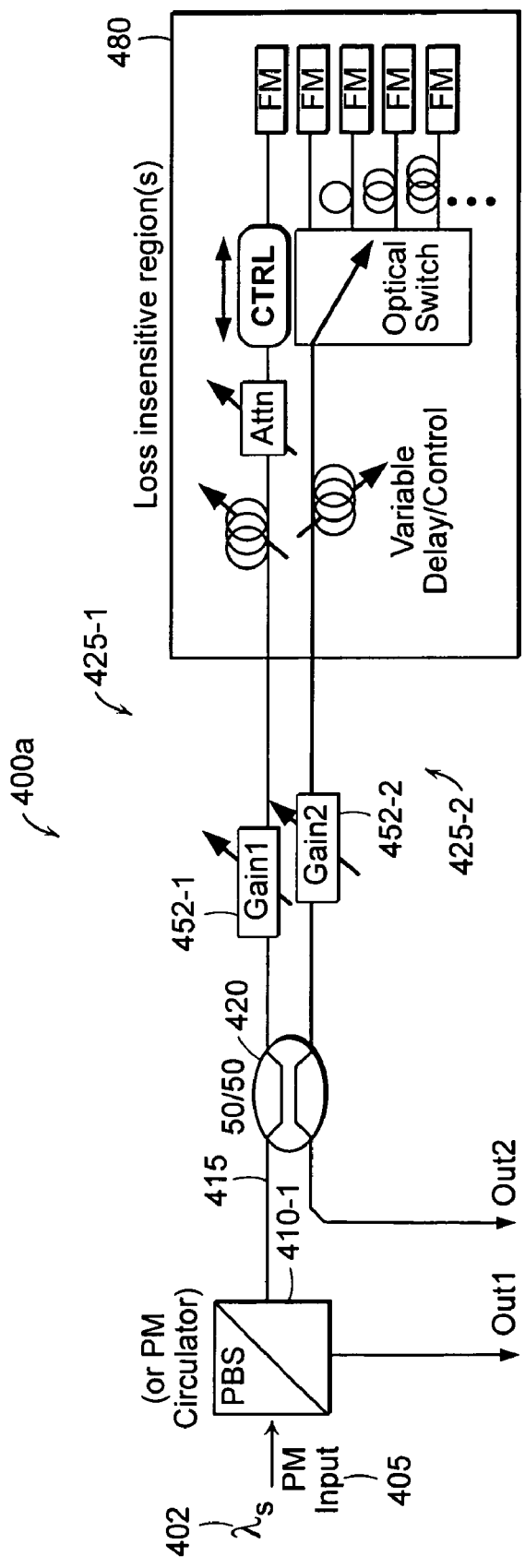
FIGS. 4A-4C are schematic diagrams of high power amplifier combiners employing a polarization independent interferometer according to embodiments of the present invention.
Figure 4B:
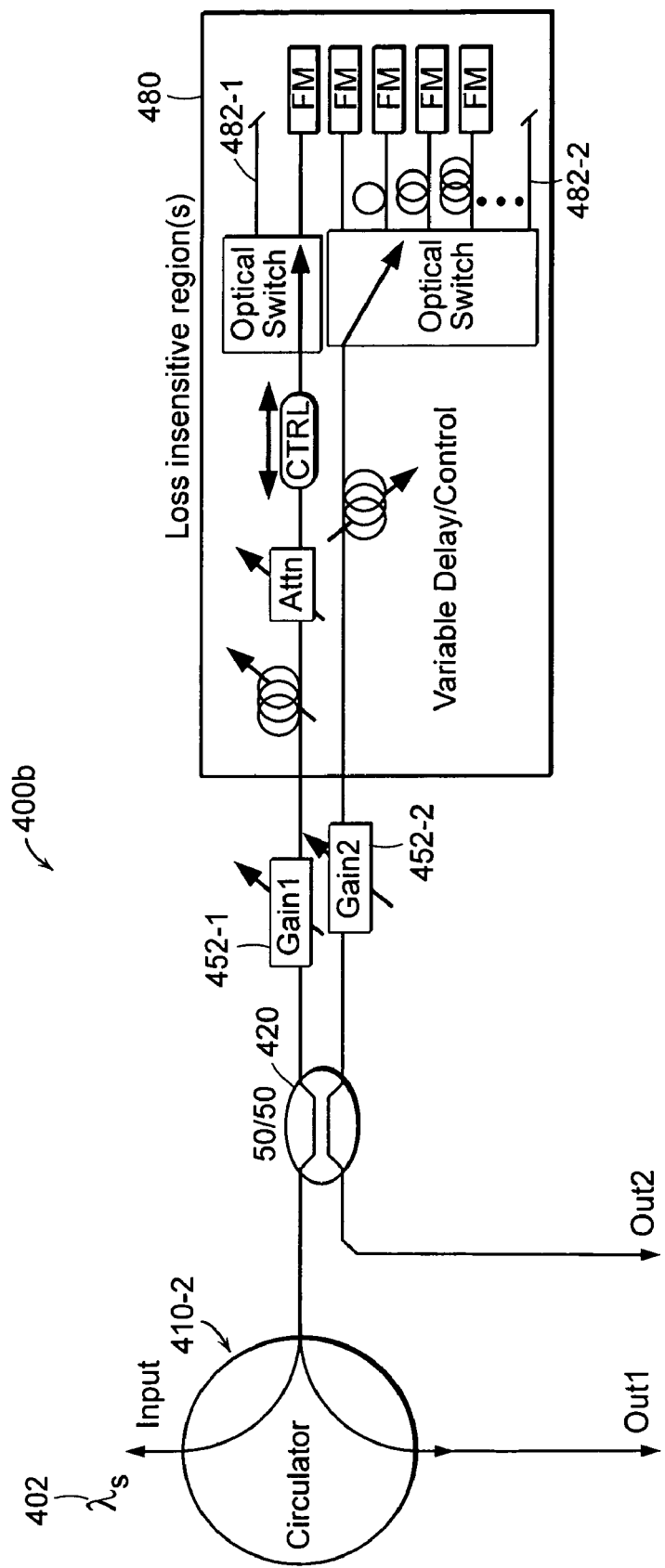
Figure 4C:
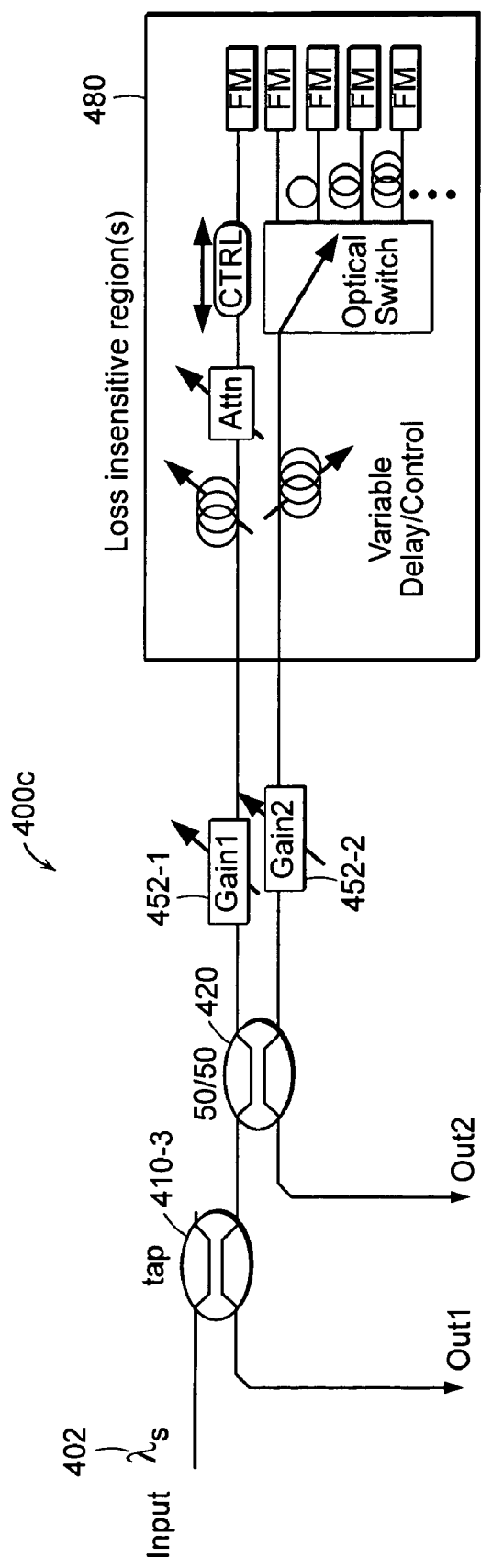

FIGS. 4A-4C are examples of interferometrically coupled, double-pass, optical amplifiers, such as Erbium-Doped Fiber Amplifiers (EDFA's) or Ytterbium Doped Fiber Amplifiers (YDFAs), which can efficiently amplify an optical signal to high power levels while either maintaining the input polarization or provide single-polarization operation. Individual double-pass amplifier designs can achieve power levels up to approximately 1-2 Watts based on existing, single-mode, pump technology and up to approximately 10 to 20 Watts based on cladding pump designs. Interferometrically coupling such designs can double the output power of conventional high power amplifiers with negligible reduction in efficiency. Further details about the double-pass amplifier is provided in U.S. Pat. No. 6,831,779 issued Dec. 14, 2004, entitled "Method and Apparatus for Stabilizing a High-gain, High-power Single Polarization EDFA," the entire teachings of which are incorporated herein by reference.

Referring to FIG. 4A, the polarization independent interferometer 400a includes a Polarization Maintaining (PM) input 405 directing an optical signal 402 to a polarization beam splitter (PBS) or polarization maintaining (PM) circulator 410. The polarization maintaining beam splitter 410 directs the optical signal 402 onto an optical path 415 to which a 50/50 splitter 420 is coupled. The 50/50 splitter 420 directs the optical signal 402 as substantially equivalent optical signals onto the optical paths in a forward direction. The optical signals are reflected and polarization rotated by Faraday mirrors, as described above.

A loss insensitive region 480 on each of the optical paths between (i) respective first optical gain medium 452-1 and second optical gain medium 452-2 and (ii) the Faraday mirrors. The loss insensitive regions 480 are regions along the optical paths 425-1, 425-2 in which losses, such as insertion losses, cause negligible effect to output power by the optical amplifiers defined on each of the optical paths 425-1, 425-2. For example, variable delay/control elements, attenuators, insertion losses into optical switches or other optical elements have negligible effect on overall efficiency within the loss insensitive region 480.

A variety of optical elements can be included in the loss insensitive regions 480 that can enhance performance or flexibility without substantially impacting output power. Such elements can include optical filters, dispersion compensating elements, phase amplitude modulators, nonlinear materials, taps, wavelength multiplexers, optical switches, delay lines, and so forth. The 50/50 optical splitters can be standard single-mode, multi-mode, or polarization maintaining, depending on the application and desired polarization state of the output. Since polarization maintaining splitters are currently available with low, approximately 0.1 dB class insertion loss, polarization maintaining amplifiers can be constructed using these instead of polarization beam splitters (PBS's), which have approximately 0.5 dB insertion loss (for broadband devices). Note that variable delay control can include elements, such as fiber stretchers, delay lines, thermal or nonlinear induced delays, etc., and can be used in any location as long as it can be used to adjust the relative phases of the interfering arms 425-1, 425-2. Another way to control relative optical phase without need for additional control elements is to adjust pump power coupled to the gain medium, which influences the phase through temperature and reflective index changes.

FIG. 4B is an embodiment of the polarization independent interferometer 400b with high power amplifier elements interferometrically combined as described above in reference to FIG. 4A. In this embodiment, the interferometer 400b includes a circulator 410-2 at the input, and includes lossy optical paths 482-1 and 482-2 as termination paths, which can be used for calibration or diagnostic purposes, or to extend the interferometer arm to subsequent cascaded elements or interferometers.

FIG. 4C is a schematic diagram of yet another embodiment of the polarization independent interferometer 400c with a high power amplifier combiner configuration. In this embodiment, a tap 410-3 is used to couple the input signal 402 into the optical paths of the interferometer 400c.

Figure 5:
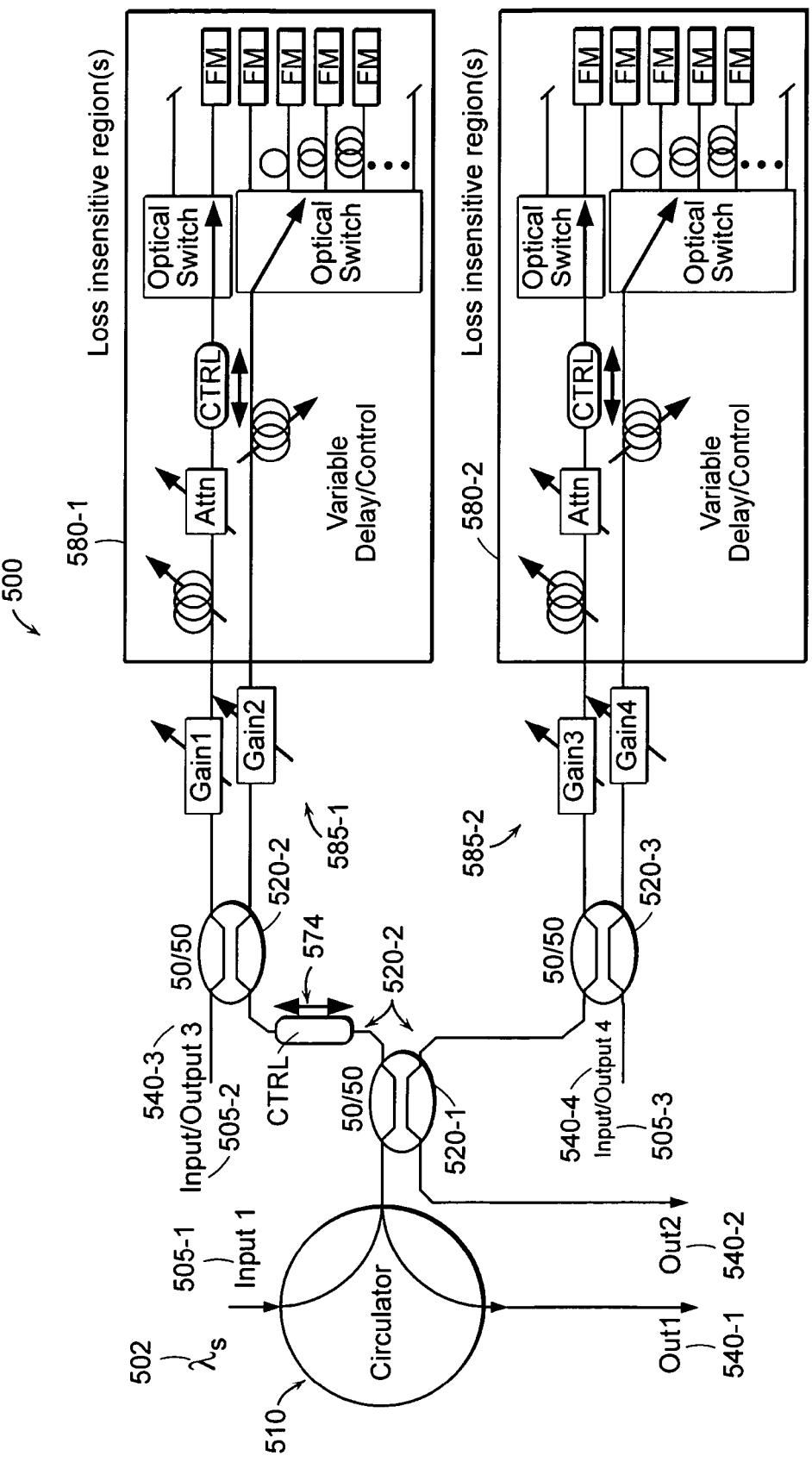
FIG. 5 is a schematic diagram of an extended high power combiner employing a polarization independent interferometer embodiment of the present invention.

FIG. 5 is a schematic diagram of the polarization independent interferometer using an extended high power combiner configuration. In this embodiment, multiple high-power, interferometrically coupled, double-pass, EDFA optical amplifiers are employed. This configuration can increase power delivered by up to four times (4×) the average power in each of the amplifying arms of the interferometric amplifier. Additional stages of optical amplifiers can potentially be added, as necessary. A net excess loss from the interferometric coupling design can be extremely low with the net 0.2 dB based on currently available components. Standard and polarization maintaining 50/50 couplers are readily available with insertion losses (IL)<0.1 dB. And, PI-interferometers with ER>20 dB may be used, which adds less than 0.1 dB to the net excess loss. As with the previous interferometric amplifiers described above, combinations of gain and phase control can be used to optimize throughput and extinction.

Referring specifically to interferometer 500 of FIG. 5, the interferometer 500 includes first, second, and third input ports 505-1, 505-2, 505-3, respectively. The interferometer includes output ports 540-1, 540-2, 540-3, 540-4. The output ports can be used for monitoring and feedback to control the interferometer and direct all the power to the desired ports. In a preferred embodiment, all the output power is directed towards the output 540-2 that traverses the output elements with the least insertion loss and leads to the highest efficiency.

A first 50/50 splitter 520-1 splits an optical signal 502, received at the first input port 505-1, onto first and second optical paths 525-1, 525-2. The first and second optical paths are configured in the form of the high-gain, erbium doped, fiber amplifiers (EDFA's), as described above in reference to FIGS. 4A-4C. The optical signal on each of the optical paths 525-1, 525-2, is coupled to the EDFA's 585-1, 585-2 via second and third 50/50 splitters 520-2, 520-3.

In this embodiment, a phase delay element 574 is employed in the first optical path 525-1 between the first 50/50 splitter 520-1 and second 50/50 splitter 520-2 to allow for adjustment control. Other microscopic or macroscopic control elements can be used on this interferometer arm 525-1. It should be understood that since the phase delay element 574 is not in a loss insensitive region 580, losses of control elements effect output power at the output ports 540-1, 540-2.

Since the Free Spectral Range (FSR) of the interferometer 500 can be adjusted by simply changing the length of each of interferometer arms, multiple wavelengths of arbitrary closeness can be amplified to high power levels using this approach. High power amplifier designs can use wavelength combiners (WLC's) to aggregate independent high power amplifiers. Current 1×2 WLC's have IL>0.5 dB and a minimum channel spacing >3 nm. Three of these combiners can be used to create a 1×4 WLC with IL>1 dB, occupying a bandwidth>9 nm, or equivalently approximately 1.1 THz.

Current WLC's often use fused tapered couplers in which the effective core size of the fiber is reduced from approximately 10 microns to approximately 1-2 microns. This reduces the effective area by up to two orders of magnitude and increases impact of deleterious nonlinear effects by an equivalent amount. In contrast, the interferometric approach illustrated in FIG. 5 is based on simple 3 dB splitters, which can be constructed from standard or large effective area fibers, or even micro-optical beam splitters, which can further reduce peak power limitations.

This amplifier design can be reconfigured dynamically to accommodate different wavelengths by simply including a variable delay element in the loss insensitive region 580-1, 580-2. Currently, 10 Watt PM and 20 Watt single-mode (SM) amplifiers are commercially available. The design of the amplifier 500 of FIG. 5 can potentially extend current technology to 80 W PM using this approach and 420 W SM amplifier gain stages.

Nonlinear polarization rotation or phase delay can be compensated for by a phase controller, preferably in the loss insensitive regions 580-1, 580-2. Nonlinearities, such as Stimulated Raman Scattering (SRS), can limit utility of conventional high power fiber amplifiers, the onset of which is a function of the peak intensity within the amplifier and the length of propagation. Accordingly, prior art amplifier designs seek to maximize cross-sectional fiber area and minimize the required length of propagation by increasing doping concentration. Such strategies can be further improved through use of the double pass, interferometrically coupled, amplifier design described above, since the cross-sectional area is increased by the number of arms, or a factor of four in this example, over the majority of the amplifier length. The aggregation path lengths though the final coupler 520-1 and preferred output 540-2 can be minimized to limit the impact of the high-intensity path. In addition, the ability to include narrow band filters within the loss-insensitive region of each of the amplifying arms without loss of efficiency can further reduce the onset of SRS effects by removing Amplified Spontaneous Emission (ASE) and nonlinear spectral components prior to the final pass.

It should be noted that the amplifiers described in FIGS. 4 and 5 can make use of multimode optical elements in the interferometer arms (such as ultra-large-core doped fibers) in embodiments where the Faraday rotation element is combined with a phase conjugate mirror. This combination causes each of the reflected optical signals to return to the 50/50 coupling element with the same phase but orthogonal polarization with respect to the forward propagating signal, which ensures that the phase and polarization distortions of the multimode elements are compensated in the return path so they do not impact the fidelity of the interference at the 50/50 coupling elements.

Figure 6:
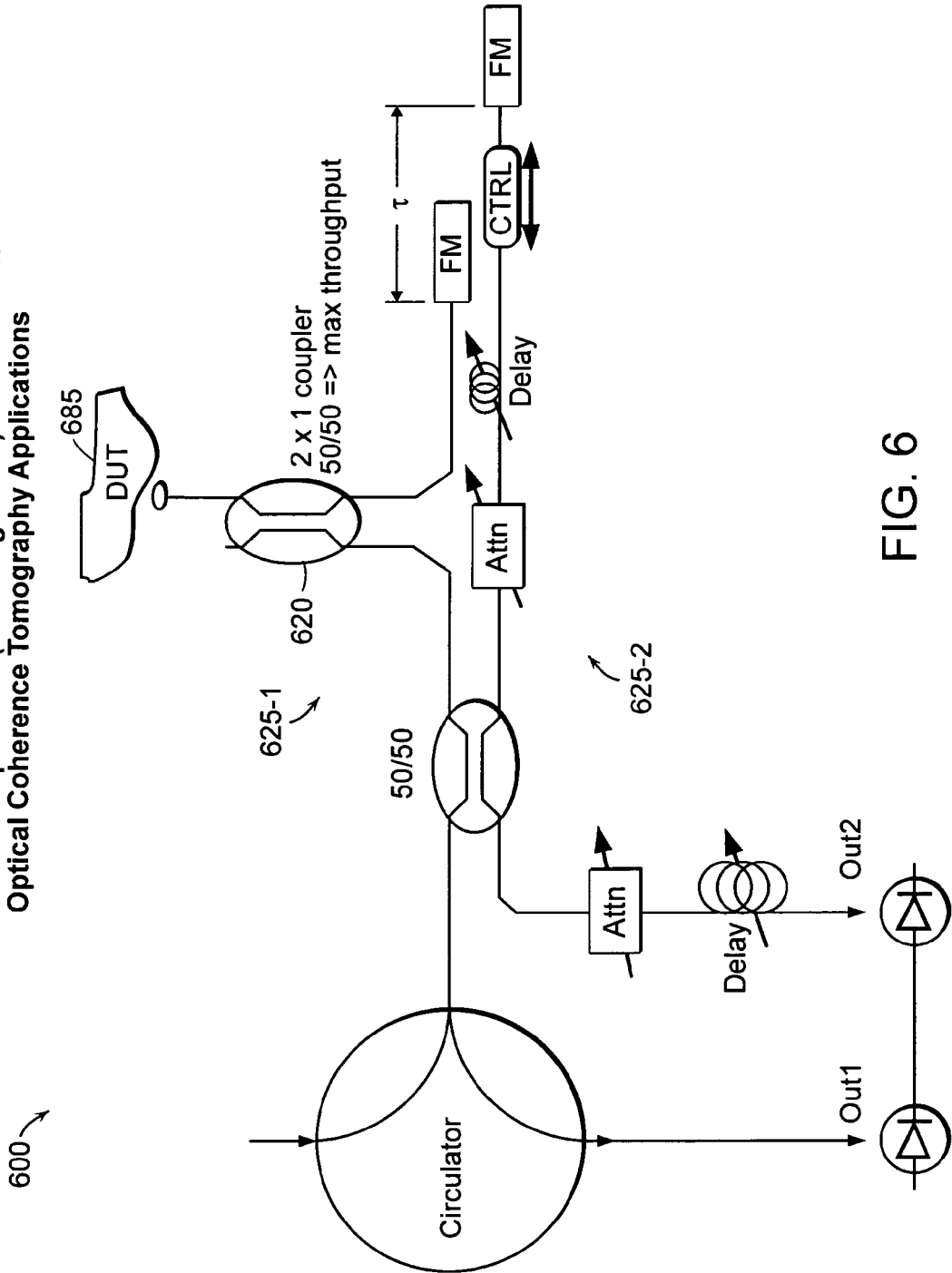
FIG. 6 is a schematic diagram of an Optical Coherence Tomography (OCT) system employing a polarization independent interferometer embodiment of the present invention.

FIG. 6 is a schematic diagram of a polarization independent and reconfigurable interferometer 600 having a configuration useful for Optical Coherence Tomography (OCT) applications. The interferometer 600 in this embodiment can be used for polarization independent interferometric measurements of a generic Device Under Test (DUT) 685. The polarization of light (not shown) reflected from the DUT 685 may not be preserved, so that a fully polarization maintaining (PM) design cannot be used to ensure polarization alignment. For medical applications or time sensitive measurements, this approach eliminates a need for any polarization adjustment. To expose the DUT 685 to an optical signal, a 2×1 coupler 620, optionally 50/50 for maximum throughput, is employed in one of the arms 625-1 of the interferometer as shown.

This design can enable both (i) improved performance over interferometers having polarization drift and (ii) reduced cost when compared to a fully polarization maintained or polarization controlled interferometer.

Figure 7:
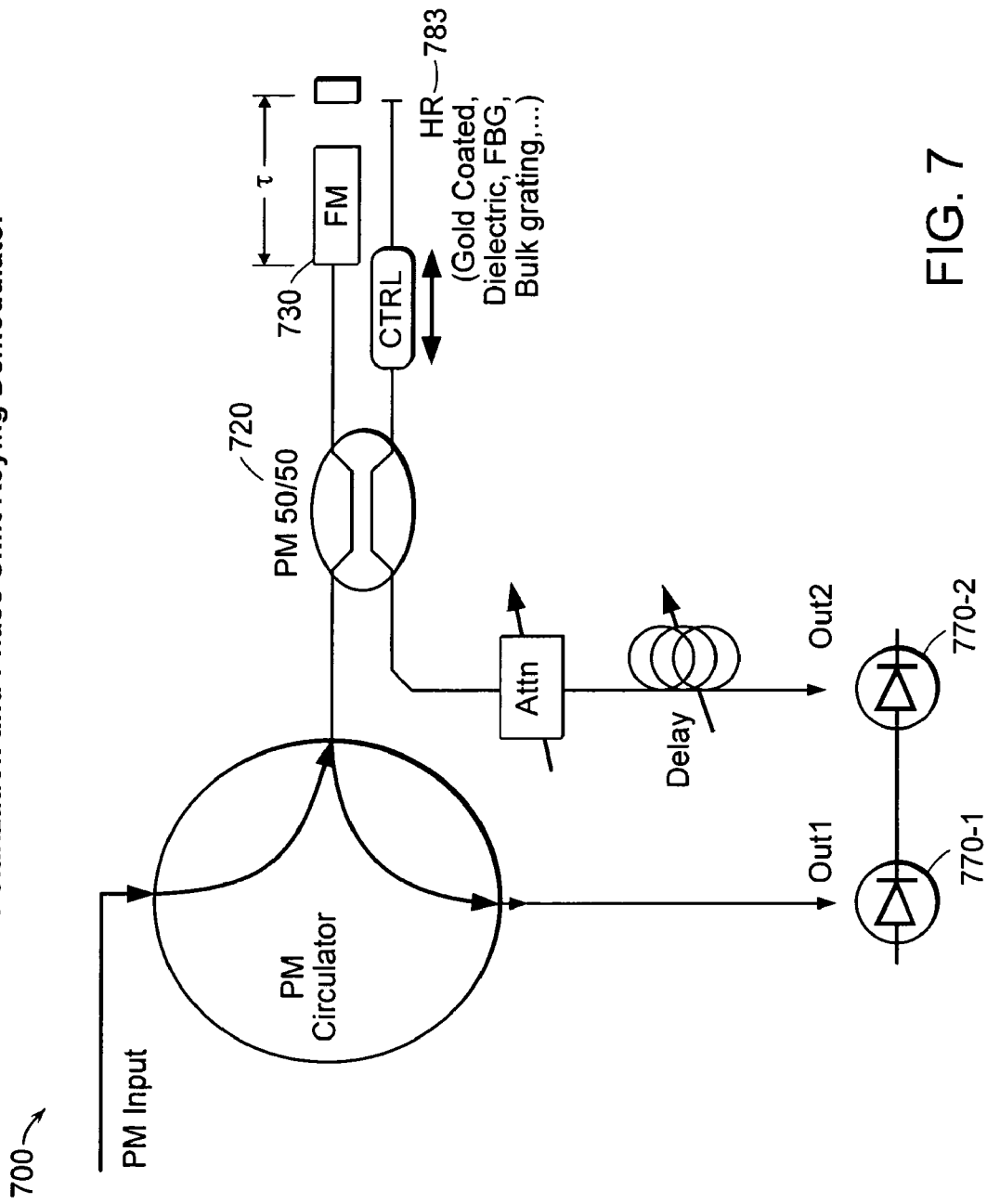
FIG. 7 is a schematic diagram of a polarization single-polarization interferometer that can be used as part of a Differential Phase Shift Keying (DPSK) receiver.

FIG. 7 is a schematic diagram of an embodiment of a polarization-dependent polarization-maintaining receiver 700 used as a polarization and phase shift keying (PSK) demodulator. The interferometer/DPSK receiver 700 can be used to receive orthogonally polarized, differentially encoded light. The polarization can be used for differential phase and polarization shift keying, in which the output is a function of both the polarization and phase of two adjacent bits. For orthogonally polarized bits, the output is simply a function of the phase; however, for bits with the same polarization, there is no interference (ideally) for the interferometer 700 or the output at each optical detector 770-1, 770-2 is the same. Therefore, the difference is equal to zero. This is similar to the polarized DPSK signals described above in reference to FIGS. 1C and 2.

An example communications system can include a transmitter that modulates both polarization and differential phase. The communications system can also include an optical preamplified receiver that precedes an optical splitter that feeds two interferometers, one standard (i.e., parallel polarization) and the other an orthogonal polarization interferometer.

Note that other interferometer designs, such as PM, Mach-Zehnder interferometers with and without one spliced with a 90 degree polarization rotation can be used to implement the functions described above for polarization and phase shift keying communications. In particular, in the schematic diagram of the receiver 700 (i.e., a demodulator), the polarization maintaining design includes one arm with a Faraday mirror 730 and the other arm with a high reflector (HR) 783, a combination that ensures orthogonality between the two arms. The HR 783 of each arm can be gold coated reflectors, dielectric coated reflectors, fiber Bragg gratings (FBG), bulk gratings, and so forth.

Figure 8A:
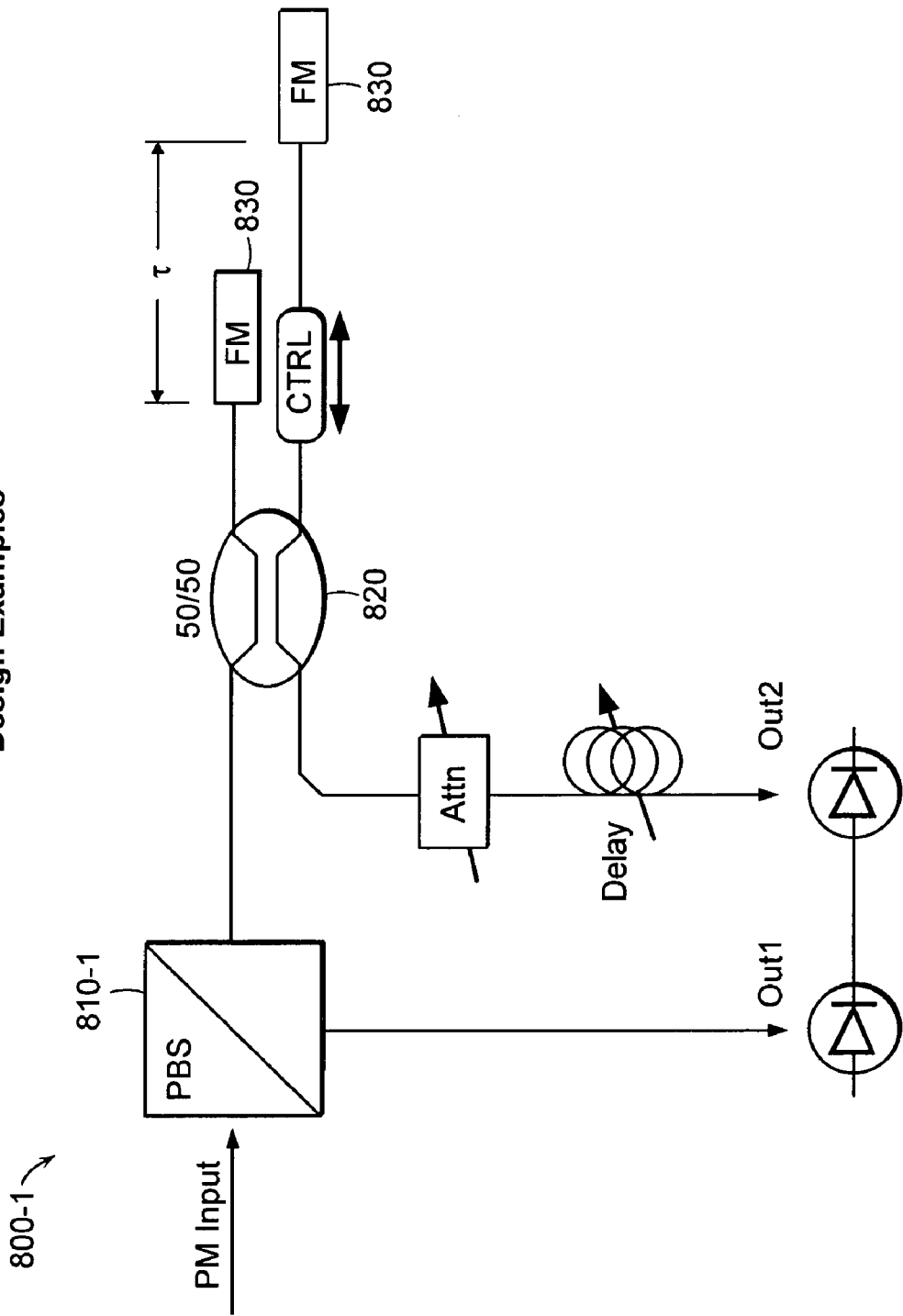
FIGS. 8A and 8B are example designs which incorporate the polarization insensitive interferometer according to embodiments of the present invention.
Figure 8B:
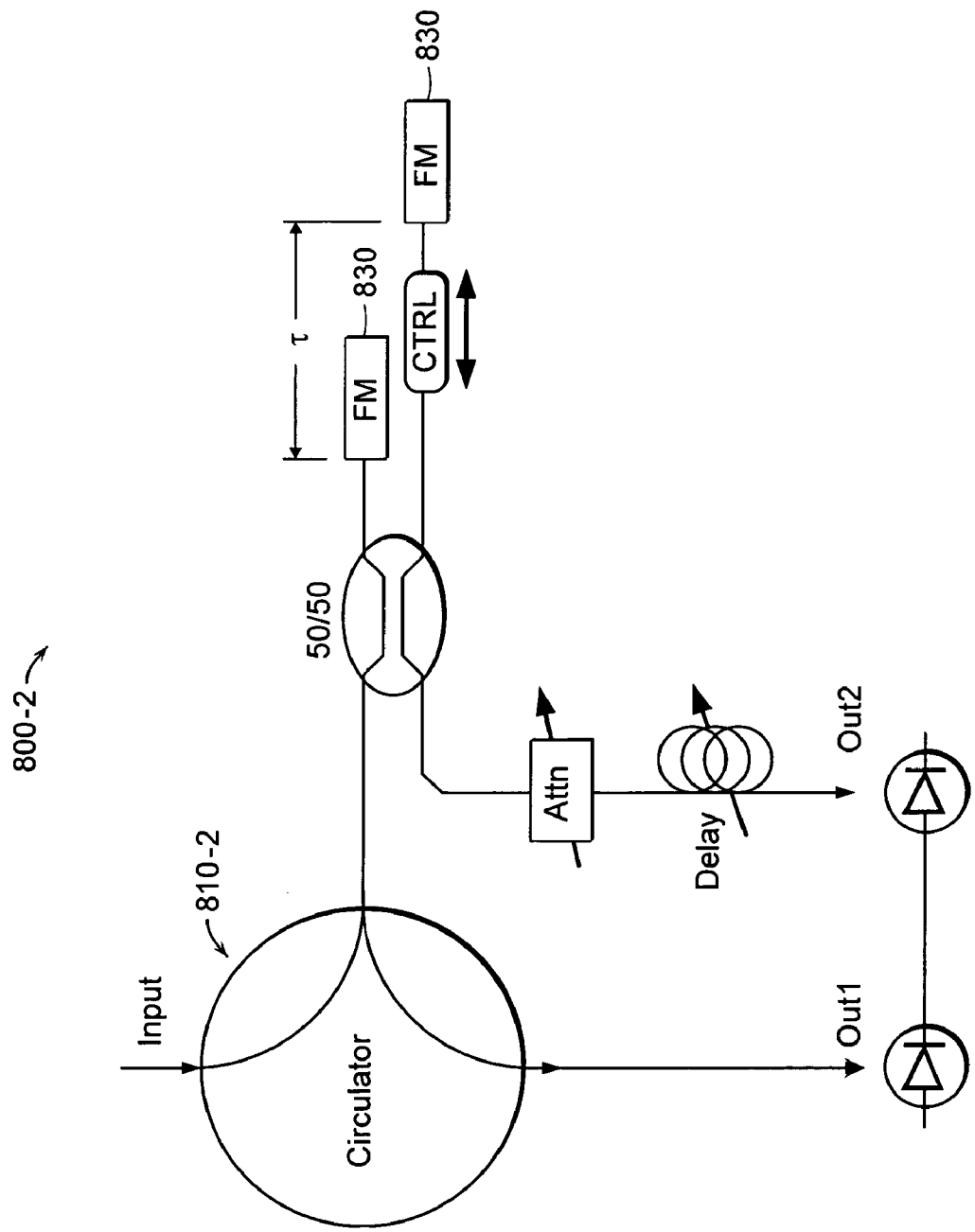

FIGS. 8A and 8B are design examples of the polarization independent interferometer according to embodiments of the present invention. FIG. 8A shows a fully polarization independent interferometer 800-1 based on standard single mode or multi-mode optical elements (OE's). To maintain linear polarization, polarization maintaining (PM) OE's may be used, such as a polarization beam splitter 810-1, PM circulator 810-1, and PM optical splitter 820. Here, the PM OE's simply maintain a state of polarization into the interferometer 800-1. After the optical splitting element 820, standard single mode components can be used. A two port optical splitter with excess loss has two outputs: x-L and 1-xL, where x is preferably equal to 1-x and L near zero for maximal extinction ratio and throughput. With no excess loss (i.e., L=0), the optical splitter 820 outputs, x and 1-x, are preferably 50%. Optical splitters with two or more ports can also be used to make an n-arm Mach-Zehnder Interferometer (MZI) where $n \geq 2$.

FIG. 8B illustrates an alternative single-polarization interferometer using polarizing elements such as a polarization beam splitter. Such a design forces the interferometer 800-1 to be single polarization state and cleans-up any residual orthogonal polarization (at Out1 in this example) due to non-ideal optical elements such as a Faraday Mirror (FM) that does not rotate the polarization by exactly 90 degrees.

Note that FIGS. 8A and 8B represent examples only. Optical elements or a plurality of standard, single-mode, optical elements can be inserted in-between the optical splitting element 810-1, 810-2 and the Faraday mirrors 830. Such optical elements can include static or variable gain, loss, dispersive, nonlinear, switching, filtering, and path length adjusting optical elements (e.g., integrated, fiber, micro, or macro optically based), as well as optical taps that can be used to provide feedback of the MZI status, WDM elements for injecting pump or signal wavelengths, and optical filtering elements. Active elements, such as electro-optical devices that can modulate phase and/or amplitude, semiconductor optical amplifiers (SOA's), saturable absorbers, etc., can also be incorporated into the interferometers 800-1, 800-2.

Figures 2, 9A:
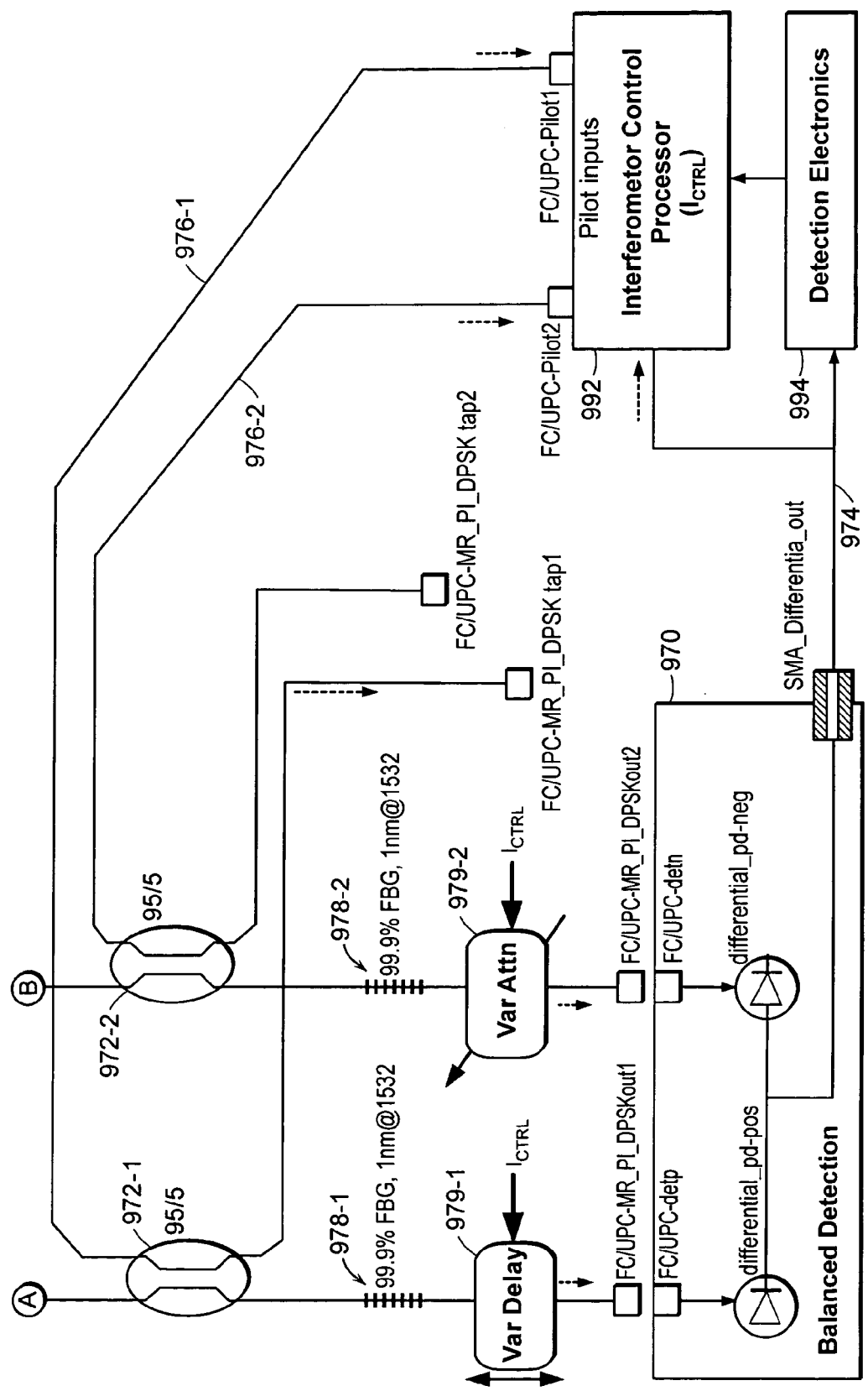
FIG. 9A is a detailed schematic diagram of a multi-rate, polarization independent (MR-PI) DPSK receiver interferometer according to an embodiment of the present invention.

FIG. 9A is a detailed schematic diagram of a variable rate, polarization independent, DPSK (VR-PI-DPSK) receiver. The embodiment of FIG. 9A includes first and second input ports 905-1, 905-2, which can accept one or more optical signals 902-1 and pilot tones 902-2, circulators 910-1, 910-2, a 50/50 beam splitter 920, first and second optical paths 925-1, 925-2, 1×5 optical switches 960-1, 960-2, and Faraday mirrors 965-2, 965-3, . . . , 965-9. This embodiment also includes terminated extension ports 965-1 and 965-10. The VR-PI DPSK receiver 900 further includes optical elements on the output arms 941-1, 941-2. These optical elements include 95/5 splitters 972-1, 972-2, fiber Bragg gratings (FBGs) 978-1, 978-2, and variable delay 979-1 or variable attenuator 979-2 optical elements. The combination of the splitters 972 and FBGs 978 collectively act as WDM elements, with the FBG reflecting the respective optical signals back through the splitters towards the circulators 910, where the FBG reflection is absorbed, and towards the interferometer control processor 992 on paths 976. In a preferred embodiment, the FBG is highly reflective (e.g., 99.99%) over at least a few FSRs surrounding the pilot wavelength, and highly transmissive at all other wavelengths, including the signal wavelength, thereby efficiently separating the pilot from signal.

The receiver 900 further includes balanced detection elements 970, signal bus 974, detection electronics 994, and interferometer control processor 992. The interferometer control processor is optically connected to the optical splitters 972-1, 972-2 of first and second pilot output signals.

The interferometer control processor 992 may use any type of controller to compensate for errors in signal or pilot intensity, delay, phase, gain, or other macroscopic or microscopic variations between differential bits being interfered, tuning of the interferometer portions of the receiver 900, or other effects. The interferometer control processor 992 may have a bus or multiple buses to electrically controlled optical elements or through other control signals, as indicated by the ICTRL indicators in the schematic.

FIG. 9B is a chart 990 that includes equations related to the design and physics of the variable rate polarization independent interferometer receiver 900 of FIG. 9A and a matrix of fiber lengths 965 between the optical switches 960-1 and 960-2 and the Faraday mirrors 930-2, 930-3, . . . , 930-9.

Figure 10A:
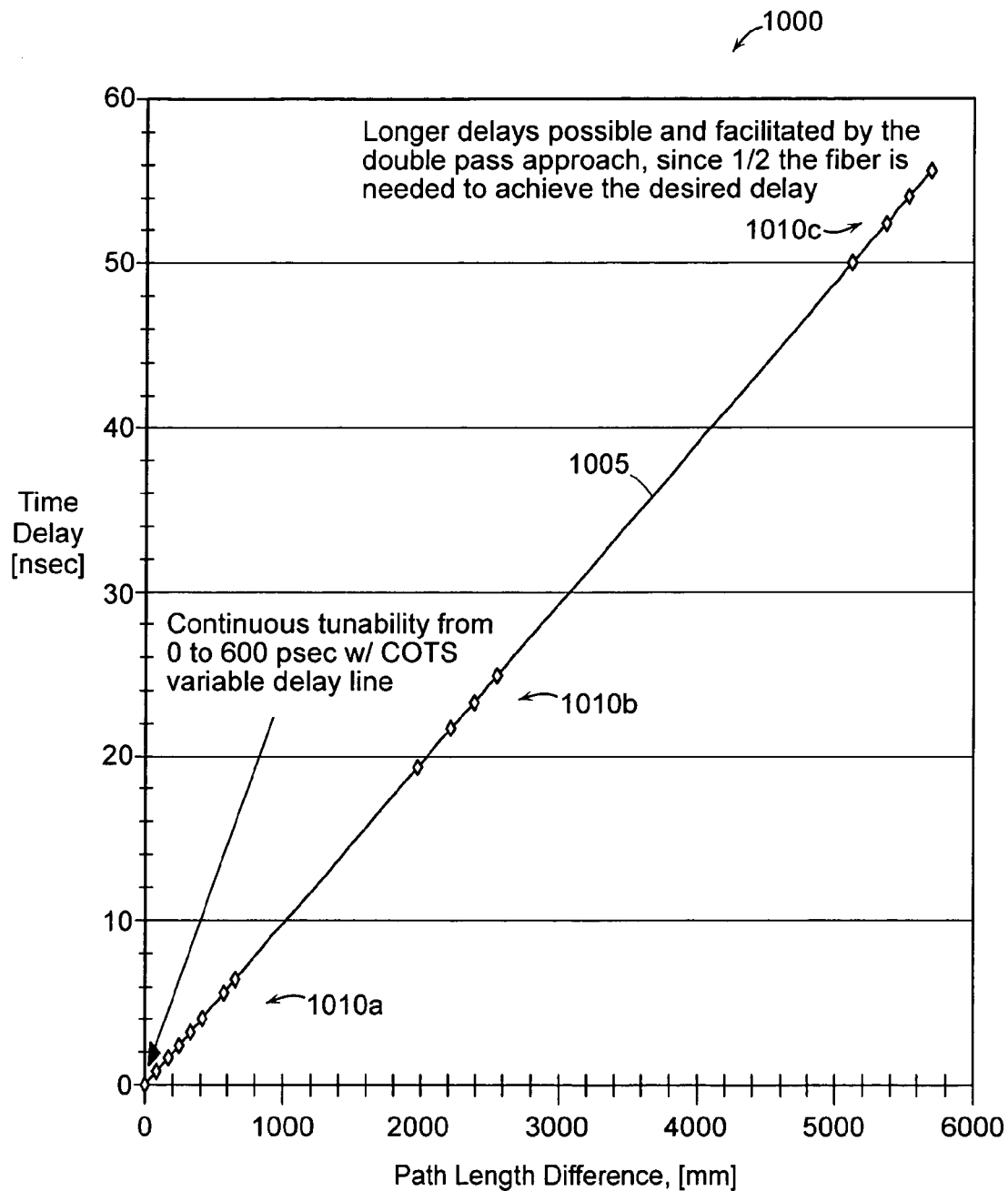

FIGS. 10A-10C illustrate an example of macroscopic and microscopic delay elements used in a variable rate polarization independent interferometer, such as the one illustrated in FIG. 9A. FIG. 10A is a plot 1000 indicating time delay in nsec versus path delay difference in mm. In the example plot, a curve 1005 extends from (0,0) to approximately (56, 5700) [nsec, mm]. In this embodiment, in three locations 1010a, 1010b, 1010c, where a macroscopic delay element in one of the interferometer arms changes state to move along the curve 1005. Then, at the locations 1010a, 1010b, 1010c, a microscopic variable delay element can be employed to make fine adjustments to the interferometer delay and FSR for optimized performance for a particular application.

The ability to adjust or reconfigure the interferometer is useful for DPSK communication signals, such as Synchronous Optical Network (SONET) signals, that may have various lengths of overhead, payload, or data rates. For example, if a given standard changes from 7% overhead to 15% overhead, the interferometer embodiment defined by the plot 1000 can be adjusted at a macroscopic level, such as from tuning at first location 1010b to a second location 1010c then fine tuning at the new location, if necessary. The fine tuning capability can also be used to relax manufacturing tolerances and compensate for aging or environmental effects. Similarly, if the data rate changes appreciably, the interferometer may change its tuning location from a first location 1010a to a second location 1010b. It should be understood that any number of tuning locations 1010 are possible and determined by, for example, an optical switch with corresponding optical paths between the switch and a corresponding Faraday mirror, as illustrated in FIG. 9A and other previous figures.

FIG. 10B is a switch matrix table indicating path lengths associated with a given switch and relative lengths in millimeters for each of the switches and their "arms" extending between the switch and Faraday mirror. The path length differences define the operating positions along the curve 1005 of FIG. 10A.

FIG. 10C is a table 1015 that includes a sorted list of lengths (dL [mm]), times (dT [psec]), and frequencies (df [MHz]). Through use of this table 1015, a controller (e.g., 992, FIG. 9) can be programmed to automatically provide the macroscopic and microscopic changes in length, time, or frequency for tuning the polarization independent interferometer or receiver to improve or optimize performance.

It should be understood that an interferometer according to the embodiment defined by the plot 1000 of FIG. 10A can provide continuous tunability from zero to 600psec, allowing the interferometer to accommodate date rates continuously varying from 100s of Gbit/s to less than 2 Gbit/s, with Commercial-Off-The-Shelf (COTS) variable delay lines at a first location 1010a along the curve 1005. Longer delays are possible and facilitated by the double pass approach, since one-half of the fiber is needed to achieve the desired delay.

Figure 11:
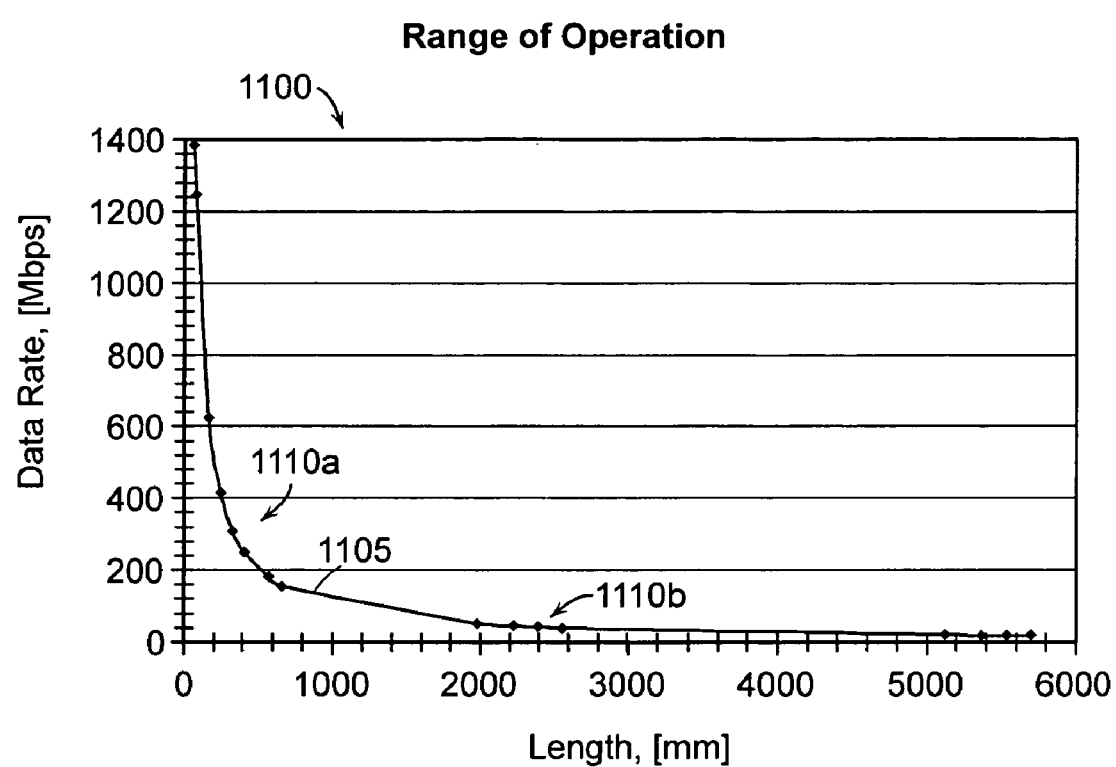
FIG. 11 is a plot of data rate versus length of optical paths representative of a range of operation of an embodiment of the polarization independent interferometer.

FIG. 11 is a plot 1100 of data rate [Mbps] versus length [mm]. A curve 1105 indicates that the DPSK receiver rate is inversely proportional to the delay. The variable rate design described above in reference to earlier figures can operate at sampled rates ranging from 20 Mbps to 1244 Mbps, including all the SONET rates from OC1-OC24, and continuously selectable rates ranging from 2.488 Gbps (OC-48) through 40 Gbps (OC-768), and beyond (e.g., many 100 Gbps). At, for example, a given location 1110a or 1110b along the curve 1105, which can be selected through macroscopic delay elements, microscopic delay elements can be employed to choose the data rate at which the interferometer is tuned. The tuning capability enables the receiver flexibility to operate with or without Forward Error Correction (FEC) codes, which can have varying overhead requirements, e.g., 7% or 15% overhead.

As briefly mentioned above, the interferometer according to embodiments of the present invention can be used for secure DPSK communications. DPSK usually compares a phase between two adjacent bits in a communications signal. By varying the bit duration, a variable rate interferometer can be used with a variable rate transmitter to prevent static eavesdroppers from correctly receiving the signal with a fixed or improperly tuned interferometer. Furthermore, the phase of non-adjacent bits can also be used to convey information. A variable rate interferometer can be used to decode such information directly, or a single rate interferometer with a time delay that is an integer multiple of the bit period combined with appropriate decoding electronics can be used to decode this information. At high bit-rates, N-bit delay DPSK may facilitate the decoding electronics implementation by providing additional time to overcome electronic feedback latencies. For example, at 10 Gbps, the bit period is only 100 psec, but using a 10-bit delay potentially allows up to a full nanosecond for electronic processing.

Note that if the interferometer is not an integer multiple of bit period noise is added to the detection process. When combined with a bit-rate, agile DPSK receiver as described herein, this can potentially be used to facilitate secure communications at the physical layer.

With the adjustable multi-rate interferometer described herein, a DPSK receiver can be dynamically reconfigured to recover differential phase information from bits of varying spacing and duration. Optical switching elements with GHz class speeds can be incorporated to allow for bursts of data with an additional level of protection. By encoding the information appropriately at the transmitter and knowing the decoding sequencer at the receiver, randomized differential phase interleaving techniques can be used to encrypt the communications signal further at the physical layer.

It should be understood that the interferometer according to embodiments of the present invention, such as the one depicted in FIG. 9A, can be implemented in a stable, ruggedized design for use in aircraft. The ruggedized design may include temperature and vibration control and 40+ GHz detection electronics. The interferometric portion of the receiver (e.g., receiver 900, FIG. 9) is indicated as a "quiet side," in which vibration and acoustic noise adversely affects operation of the receiver. Therefore, acoustic insulation and vibration control mounts and packaging are preferably employed in conjunction with feedback control to tunable delay elements to achieve expected performance.

Figure 12A:
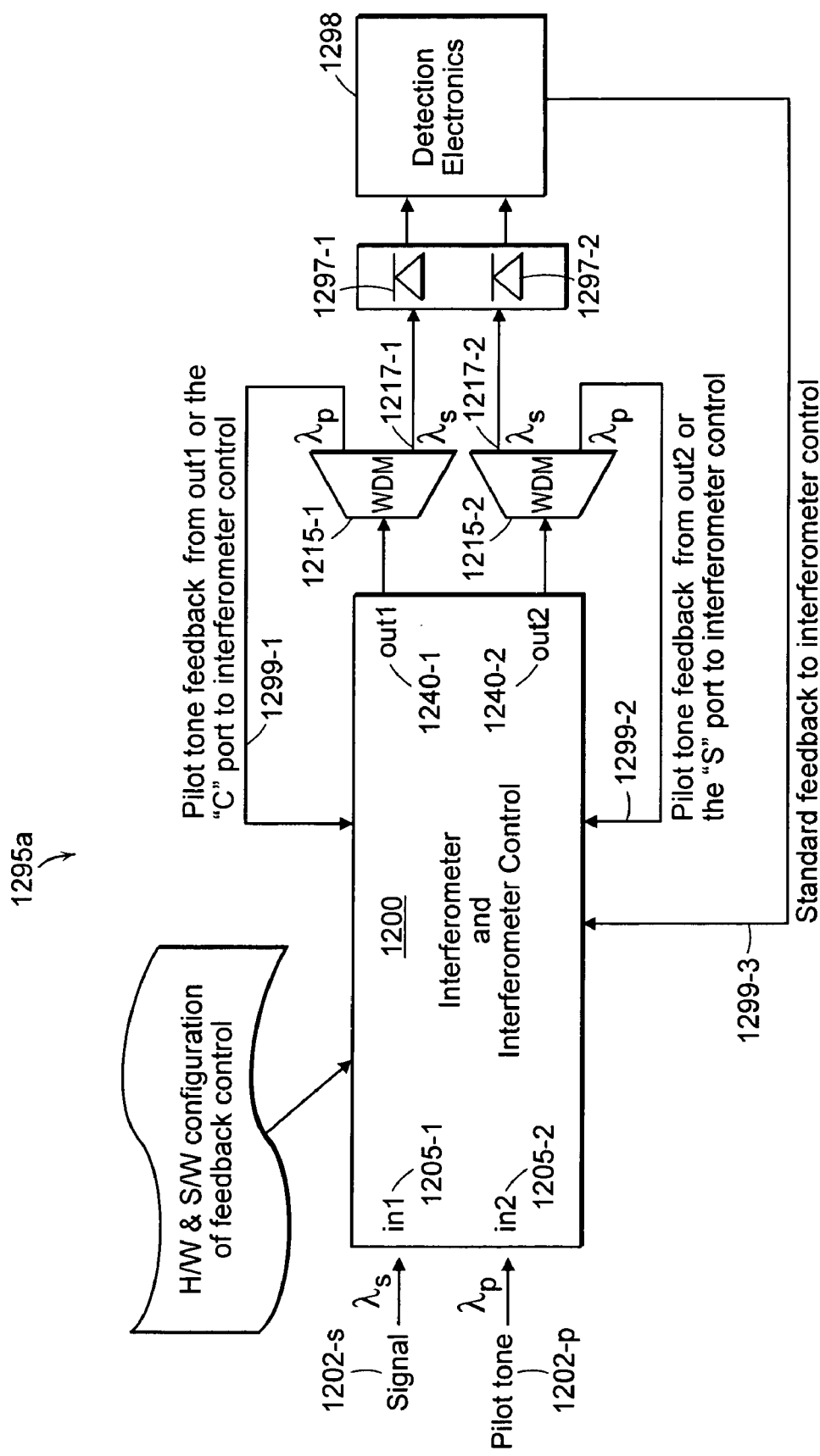
FIGS. 12A and 12B are example embodiments in which a pilot tone may be used to control tuning of an interferometer.
Figure 12B:
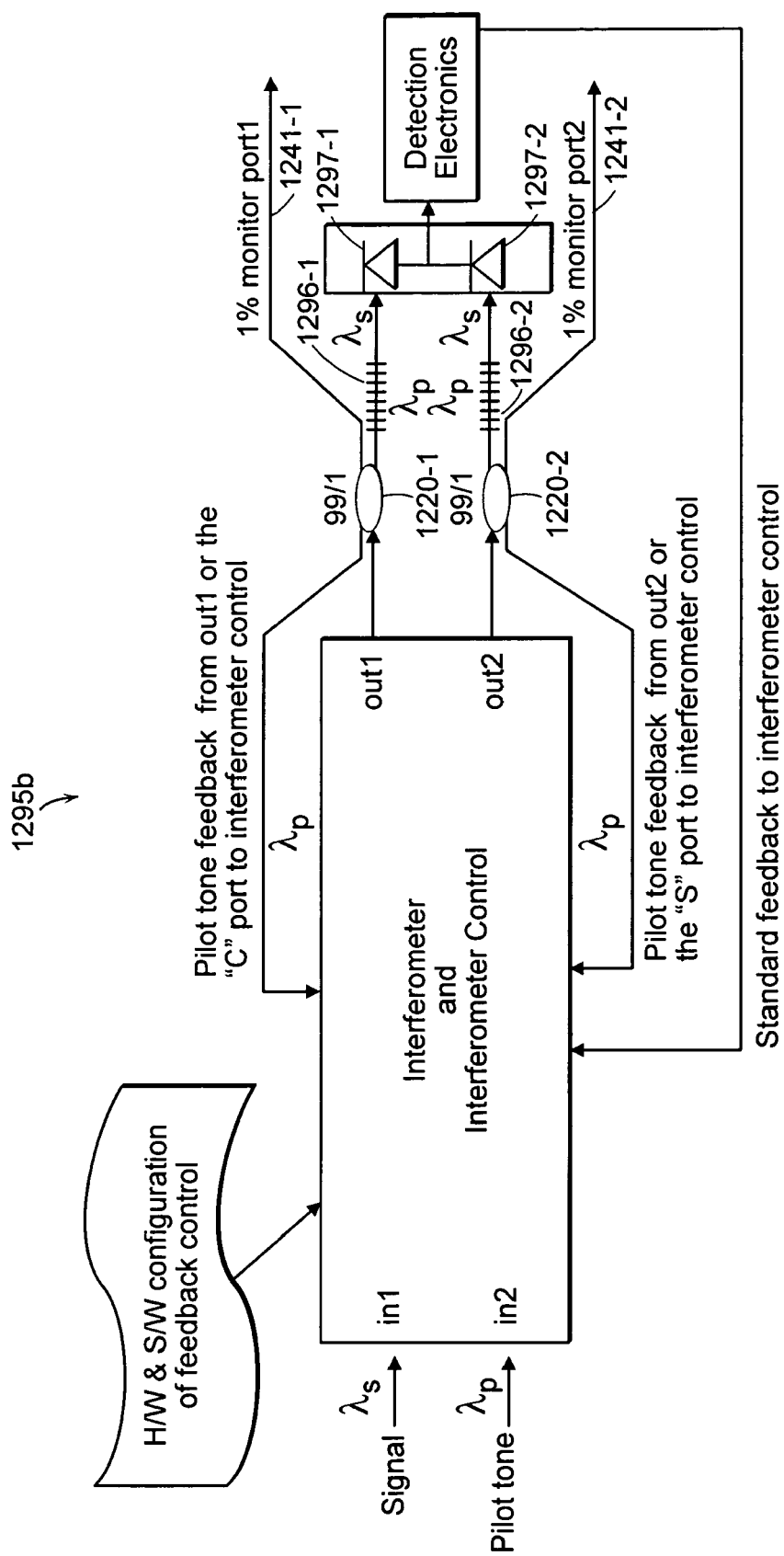

FIGS. 12A and 12B are example embodiments in which a pilot tone may be used to control tuning of an interferometer. FIG. 12A is an example setup for using the pilot tone 1202-$p$, to control an interferometer 1200, which can be part of a DPSK receiver 1295$a$ or other interferometric device. In this case, wavelength is used to separate a signal 1202-$s$ and pilot tone 1202-$p$ which are both forward propagating. The signal 1202-$s$ and pilot tone 1202-$p$ are received at inputs 1205-1, 1205-2, respectively, at the interferometer 1200. The interferometer produces outputs from output ports 1240-1, 1240-2. The outputs from the interferometer are received at wavelength division multiplexers (WDM) 1215-1, 1215-2, which separate the optical signal 1202-$s$ from the pilot tone 1202-$p$. The pilot tone from the WDM's 1215-1 are fed back 1299-1, 1299-2 to the interferometer 1200. The optical signal 1202-$s$ propagates via optical paths 1217-1, 1217-2 from the WDM's 1215-1, 1215-2, respectively, to respective optical detectors 1297-1, 1297-2. The optical detectors 1297-1, 1297-2 are electrically connected to detection electronics 1298, which determines or calculates standard feedback for use as interferometric control sent via a control line 1299-3 connecting the detection electronics 1298 to the interferometer 1200.

FIG. 12B is another embodiment illustrating pilot tone signals separation via fiber Bragg grating (FBG) reflective wavelength filters 1296-1, 1296-2. Note that balanced detection shown by way of the detectors 1297-1, 1297-2 may be necessary for obtaining optimum DPSK performance and can be implemented using any of the methods currently understood, such as using individual detectors as shown in FIG. 12A or FIG. 12B. Alternatively, control and detection can be implemented without balanced detection. In the embodiment of FIG. 12B, the interferometer 1295$b$ may also include a pair of 99:1 splitters 1220-1, 1220-2, which provides a 1% output of the pilot tone to respective monitor ports 1241-1, 1241-2.

Referring generally to FIGS. 12A and 12B, in a preferred embodiment, the pilot tone 1202-$p$, indicated as $\lambda p$ in FIG. 12A, can be a Commercial-Off-The-Shelf (COTS) distributed feedback (DFB) laser, preferably outside of the useful communications band corresponding to the optical signal 1202-$s$ so that it does not reduce the available bandwidth, e.g., 1530 nm. The pilot tone wavelength can be calibrated via temperature and current settings or through another method, such as a feedback from a built-in temperature controlled etalon or an external wavelength reference, such as a wave meter. In a preferred embodiment, the pilot tone is operated as a Continuous Wave (CW), single wavelength source, although dithers in either wavelength or amplitude can be introduced to allow synchronous control/detection methods. Typical DFB lasers can easily be temperature tuned in excess of a nanometer at 15×× nm wavelengths, which provides more than 120 GHz of tuning range, or more than 340 GHz interferometer FSR's. This range is more than adequate for a single laser pilot source to unambiguously tune the interferometer to accept wavelengths anywhere within a 40 Gbps DPSK receiver free spectral range (FSR) and by monitoring the power at the "C" side and "S" side pilot outputs to determine the contrast D, defined by:

$$D = \frac{C-S}{C+S} \qquad \text{(Equation 1)}$$

This information can be used to measure the interferometer and confirm proper values of interferometer parameters, such as FSR and extinction ratio (ER). The C-side and S-side monitor points receive signals reflecting off highly reflecting FBG filters, which reflect only a narrow band around the pilot wavelength, thereby reducing potential noise sources in the pilot path.

Figure 16A:
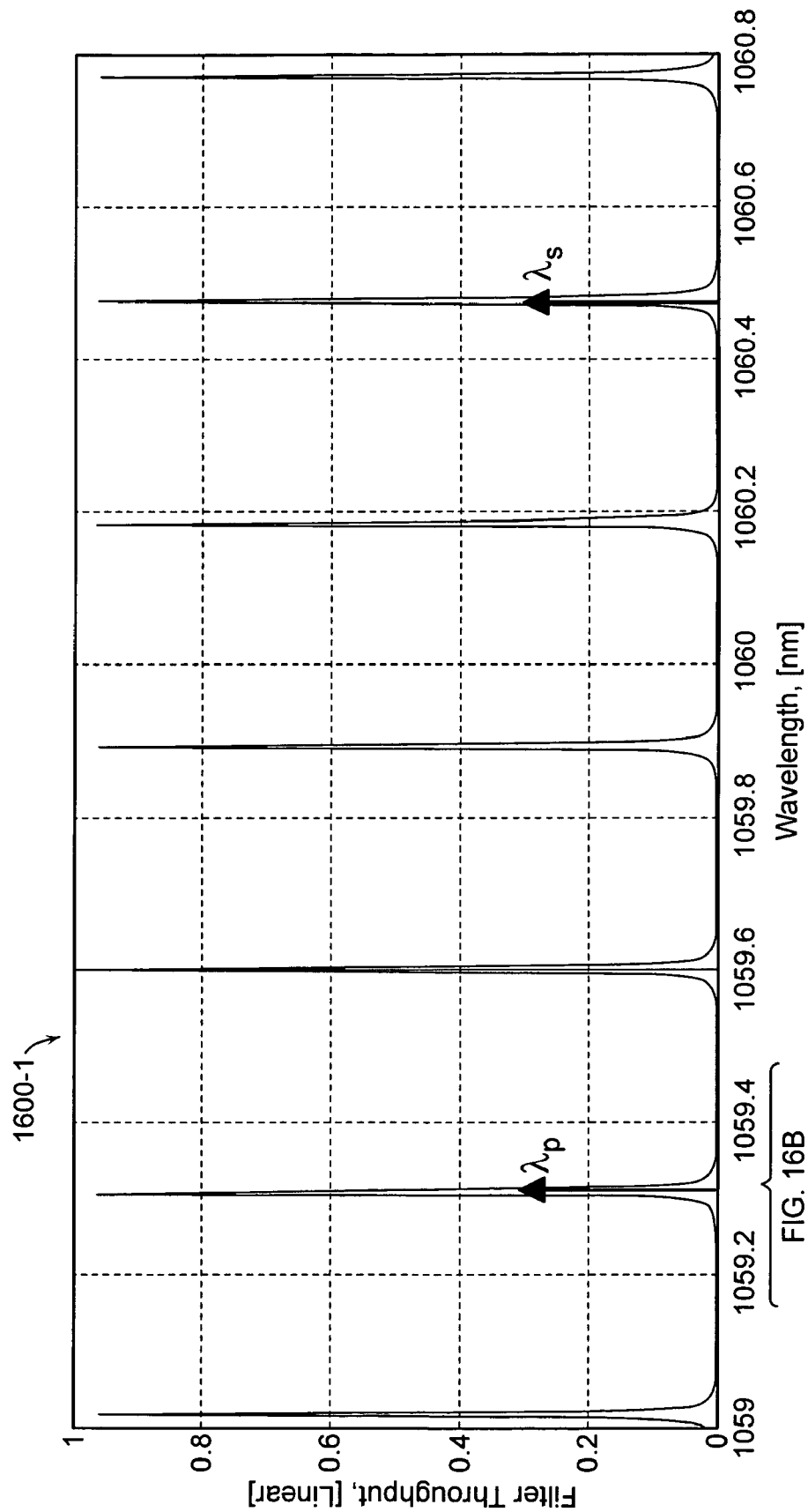
FIGS. 16A and 16B illustrate a transmission spectrum of a Fabry-Perot (interferometer) filter, showing a signal tone $\lambda_s$ and a pilot tone $\lambda_p$ aligned near another spectral mode.
Figure 16B:
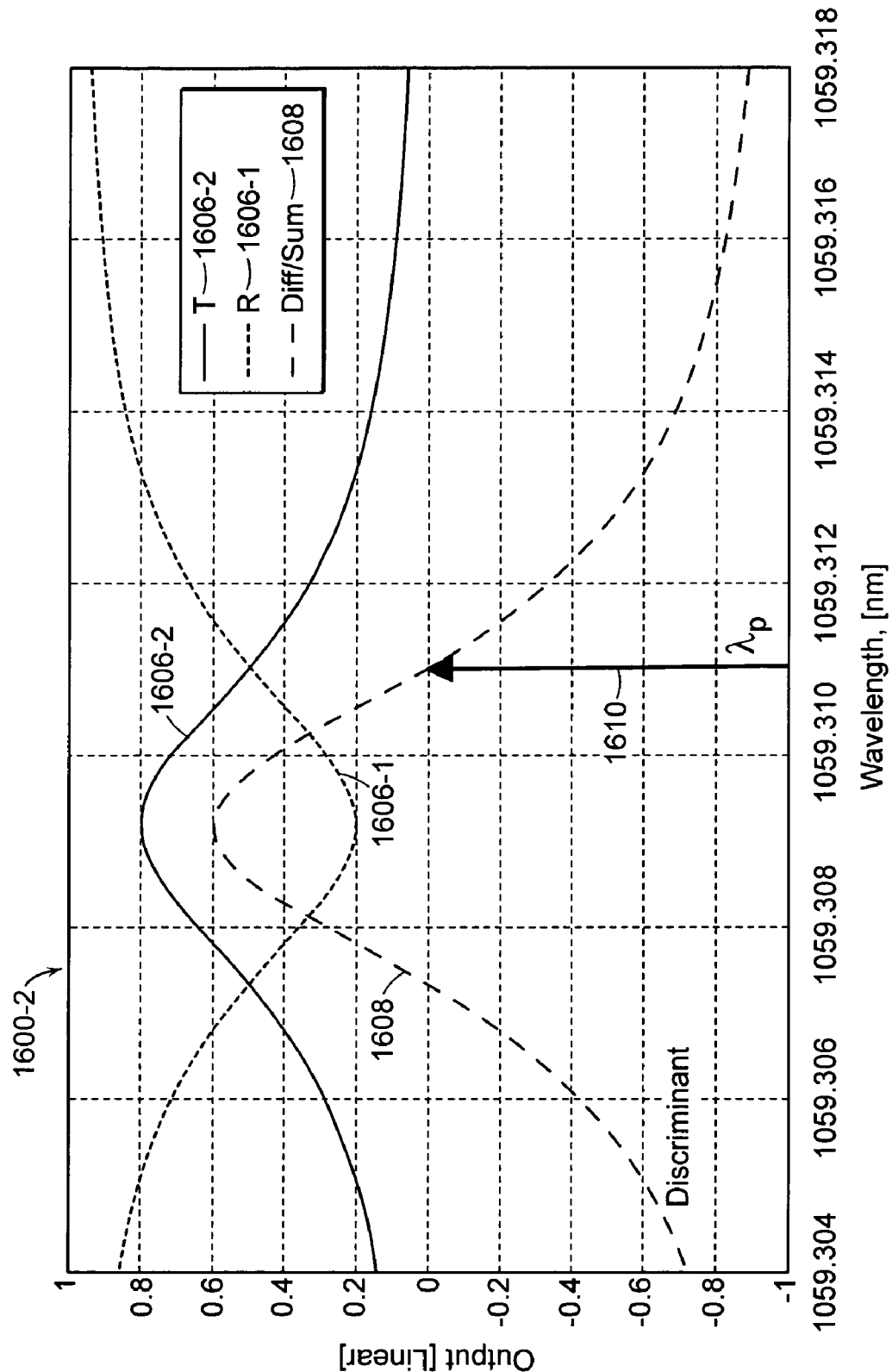

The FSR corresponds to the frequency or wavelength spacing between $D_{max}$ and $D_{min}$ (see FIGS. 16A, 16B for illustration). Such information is particularly useful for confirming the FSR for variable rates interferometers. The ER for each interferometer output corresponds to $C_{min}/C_{max}$ and $S_{min}/S_{max}$, respectively. For an interferometer with auto-calibration capabilities, such measurements can be used as a feedback parameter to optimize the interferometer performance. The contrast, D, is useful in that it provides a measured number in the range of −1 to +1 that corresponds to a unique phase within the interferometer FSR. Therefore, by setting a target for the contrast ($D_{target}$), a control system can align the interferometer to any point (i.e., phase) within the FSR.

With knowledge of the interferometer FSR, which can be known in advance or measured, and with knowledge of the locking pilot wavelength, which also can be measured or known in advance, the interferometer can be tuned to accept an optical signal (e.g., an optical DPSK communications signal) at any wavelength within the operation range of the interferometer. Further, since the interferometer is periodic, this method can extend to accept one or more signals or references, which can be subsequently separated via optical fibers or wavelength division multiplexers (WDMs). For DPSK, multiple signal channels can be received with wavelength spacing that is an integer multiple of the interferometer FSR. This spacing can be reduced to an integer multiple of FSR/2 as long as polarity correction can be applied to the received DPSK data.

Figures 3, 9A:
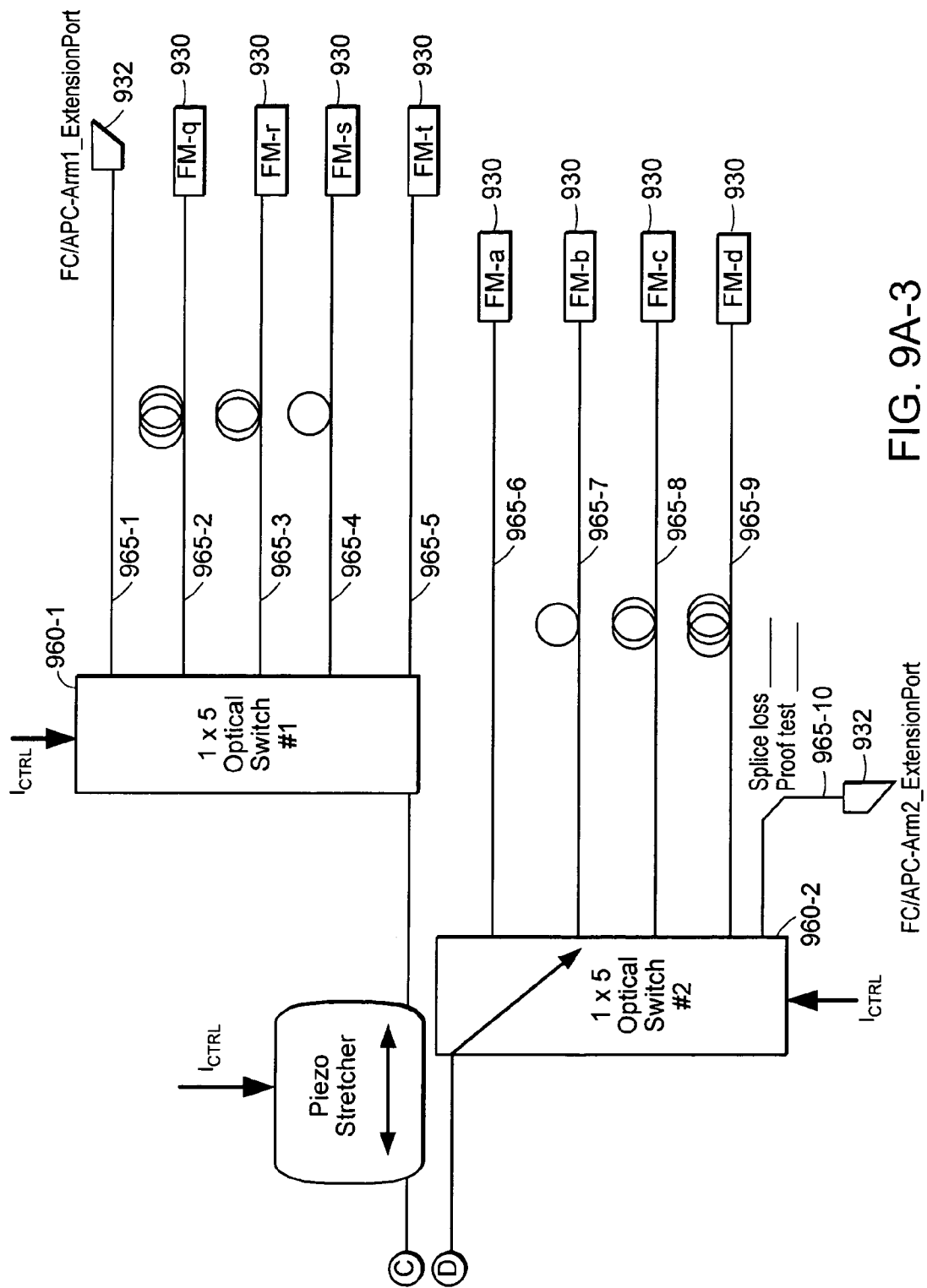

Referring again to FIG. 12A, residual unwanted pilot tone 1202-p can be "stripped" from output port(s) if necessary with use of an optional pilot tone rejection or separation filter, as described in embodiment of FIG. 9, implemented using a standard WDMs such as a highly reflective fiber Bragg grating (FBG) filters, centered on the DFB center wavelength and a flat top bandwidth of approximately 2 nm, allowing for adequate tuning of the pilot wavelength. This implementation can reduce the pilot incident on the output detectors 1297-1, 1297-2 by >30 db (when using 99.9% FBG reflectors), which is typically adequate for optimally preamplified DPSK receivers that typically have approximately mW power levels incident on the detectors. Further, by setting a target contrast $D_{target}=0$, meaning the pilot power in Out1, 1240-1 is approximately equal to the power at Out2, 1240-2, any residual CW pilot tone power after differential detection cancel, providing additional pilot rejection. Since the pilot tone is CW, any residual is DC term, and is thus rejected via downstream AC coupled electronics. Alternatively, since the interferometer 1200 is a symmetric device, the pilot tone can be inserted in a reverse direction, which eliminates residual pilot tone from the communications detectors without necessarily using pilot tone rejection filters, as shown in FIG. 14.

Note that this preferred embodiment allows for complete dither-free control of the interferometer, either in the incoming optical signal or interferometer phase, in contrast with prior art techniques. Furthermore, it should be noted that other dither-free control approaches can be applied, such as maximizing one arm of the interferometer, minimizing the other, or both, and use pilot wavelength control to place the interferometer in a region with a highest dither-free alignment sensitivity. For DPSK reception, a performance penalty is incurred whenever the interferometer and signal wavelength are misaligned.

Figure 13:
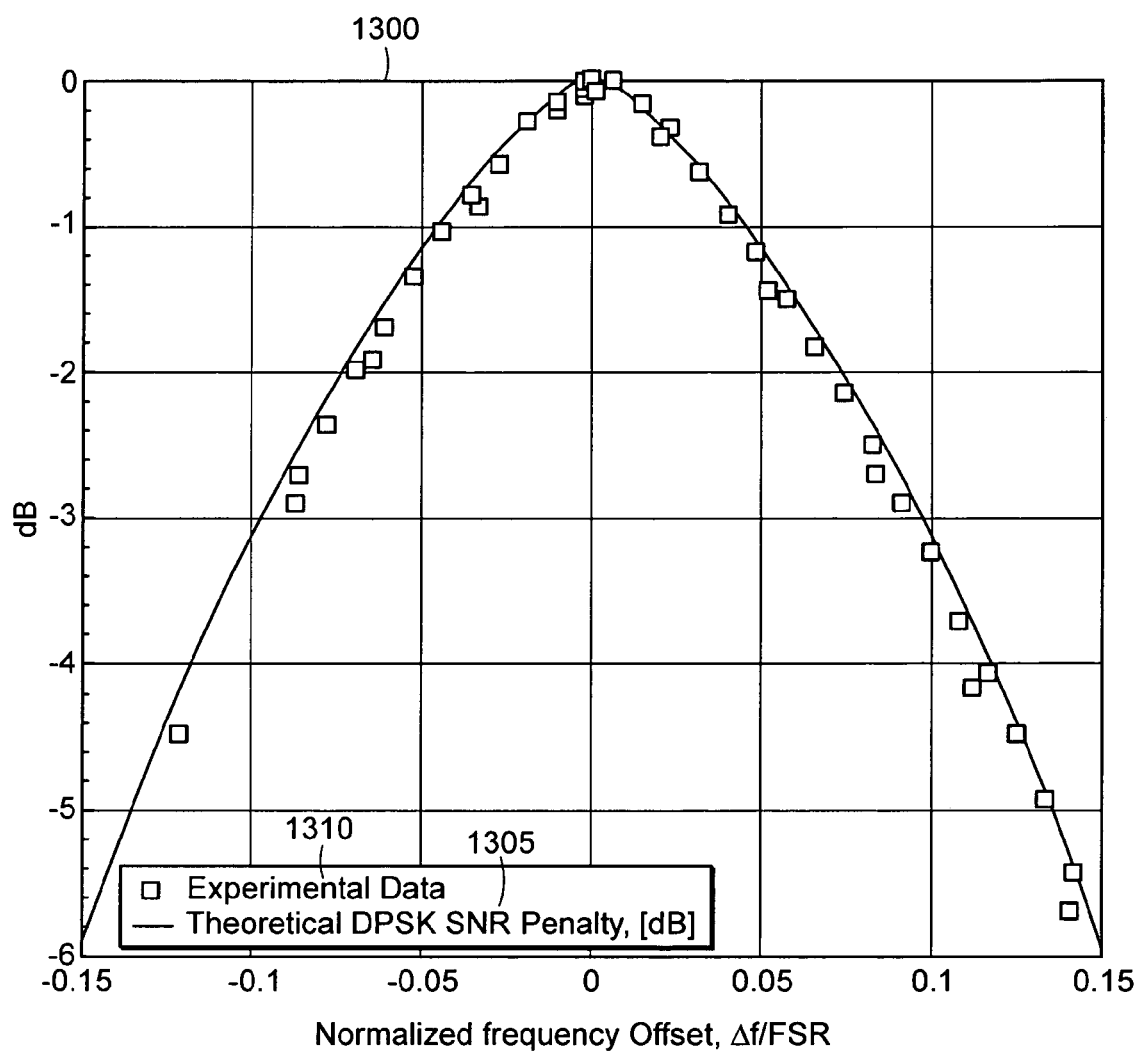
FIG. 13 is a plot indicating DPSK interferometer to signal wavelength alignment penalty in dB versus normalized frequency offset.

FIG. 13 is a plot having a theoretical DPSK SNR penalty [dB] curve 1505 and experimental data 1510 illustrated by square data points about the curve 1505. The plot shows the penalty is negligible for frequency offsets less than approximately 1% of the interferometer FSR, which is typically equal to the data rate. While dither-free operation enabled by the pilot tone based approach described herein may simplify the interferometer control and provide improved performance (e.g., dither induced extinction ratio degradation or wavelength offset), control approaches using local wavelength or interferometer path length dither can be incorporated into this pilot based method of control. It should be understood that the dither may be applied via optical components in the optical paths of the interferometer arms, such or may be applied via mechanical motion of, for example, a Faraday mirror through Piezo actuator motion control.

FIG. 13 further illustrates theoretical and experimental DPSK performance penalty as a function of normalized frequency misalignment between the incoming signal and the interferometer. The normalization factor is the interferometer FSR, which, for typical DPSK receivers, is equal to the data rate. As suggested, to avoid penalty, the normalized frequency offset should be less than approximately 1%.

Figure 14A:
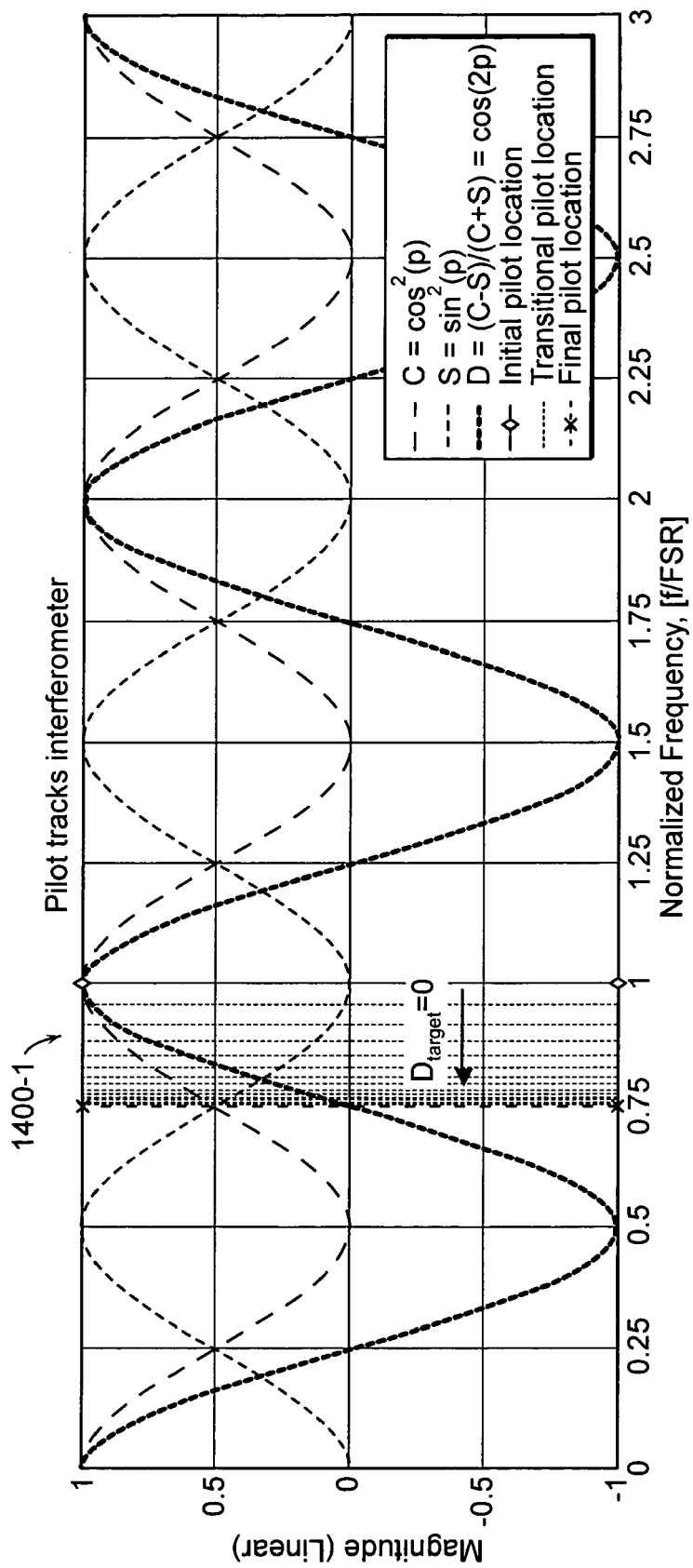
FIGS. 14A and 14B are plots of waveforms of pilot tone sinusoids and carrier frequency sinusoids of an optical signal in which the plot of FIG. 14A illustrates a pilot tone that tracks on an interferometer (i.e., carrier wavelength of an optical signal) and the plot of FIG. 14B illustrates an interferometer that tracks on the pilot tone.
Figure 14B:
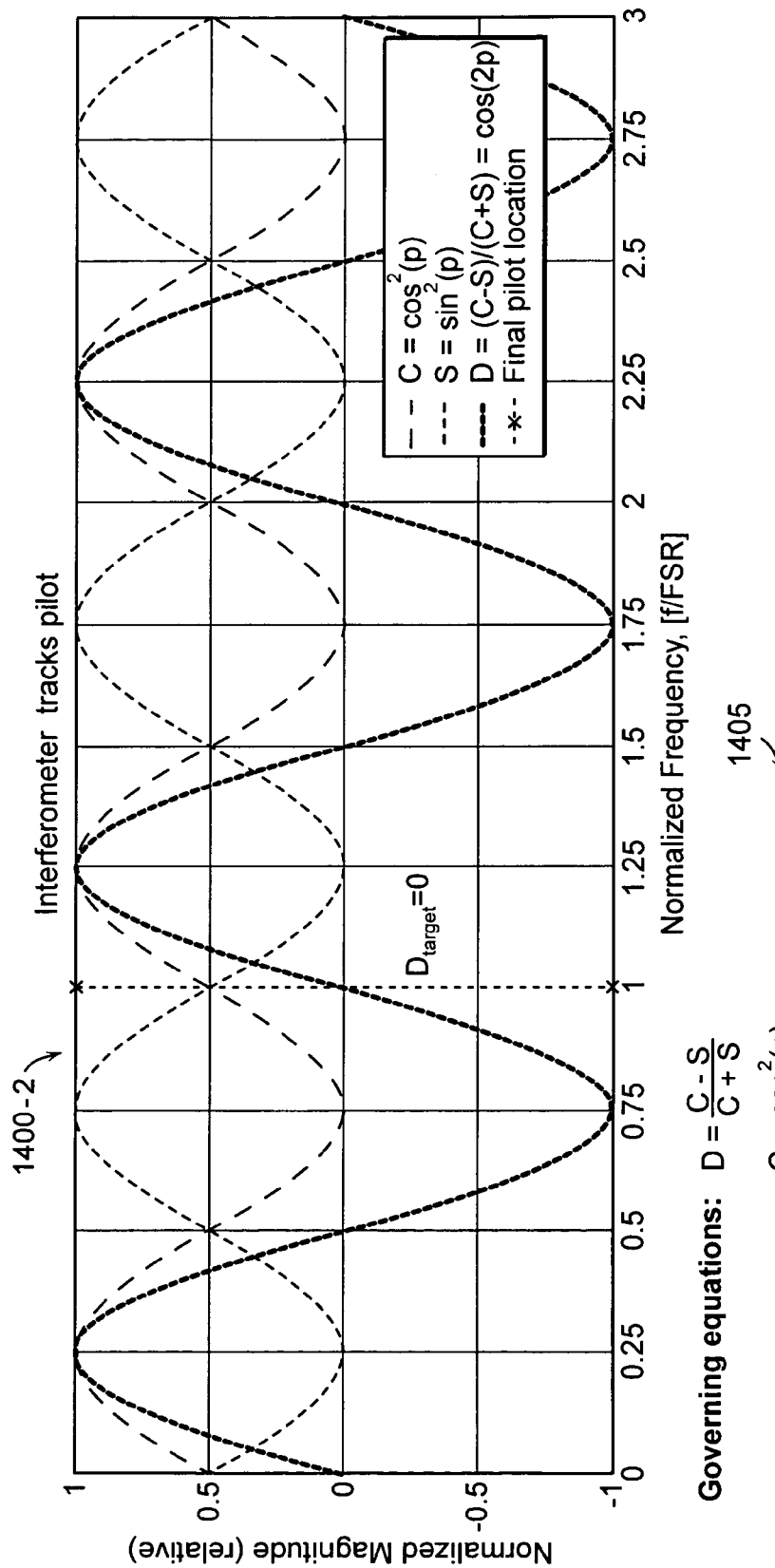

FIGS. 14A and 14B illustrate pilot tone stabilization simulation and analysis. FIG. 14A is a plot 1400-1 of a pilot tone that tracks the interferometer. FIG. 14B is plot 1400-2 of an interferometer that tracks a pilot tone. Equations 1405 govern the pilot tone stabilization of the interferometers producing the curves in the plots 1400-1, 1400-2.

The need for polarity correction in a DPSK receiver comes from the fact that the interferometer outputs are complementary, as seen in FIGS. 14A and 14B, following a $\cos^2$ and $\sin^2$ dependence. Interferometer controllers commonly lock onto the DPSK signals by optimizing the peak detected photocurrent in one or both arms of the interferometer. This technique locks on to the DPSK signal with a polarity ambiguity, in which the demodulated output can be inverted (e.g., interferometer optical outputs Out1 and Out2 are switched). Polarity correction implies either correcting the optical signals, which can be achieved optically by shifting the interferometer alignment by FSR/2 or applying conditional inverting electronics, which simply invert the logically data as necessary, the condition being either anticipated or measured, e.g., based on received wavelength, power, and/or estimated Bit Error Rate (BER). For incoming signals of either known or measured wavelengths, inability to control the precise interferometer alignment can eliminate this polarization ambiguity and a need for inverting electronics for a signal channel DPSK receivers.

A method of optimizing performance of a DPSK receiver that can accommodate transmitter or receiver drifts in wavelength using one or more pilot tones is now described. First, before a signal is received, the pilot tone(s) can be used to align the interferometer to the anticipated wavelength, as illustrated in FIG. 14B. This eliminates a need for scanning the interferometer to search for an incoming wavelength as long as the anticipated and received wavelength are relatively close, e.g., correct to within approximately 20% of an FSR. Once the signal is received, with incoming power above a predefined threshold, $P_{min}$, the interferometer control can switch to tracking on the signal using approaches understood in the art, which, due to rough alignment with the pilot tone, has the correct data polarity. Therefore, the control system need only track on the signal, if at all, when the signal is relatively strong, which reduces a dynamic range of operation required of the signal tracking control. While the signal is strong, any misalignment between the pilot wavelength needed for correct interferometer alignment to the signal can be eliminated by having the pilot tone aligned to the interferometer, as illustrated in FIG. 14A. In this manner, a locally resident pilot tone can effectively track an incoming signal that can be slowly drifting due to poor control, aging, or Doppler shifts in moving platforms. Should the signal drop out, the interferometer control can switch back to the well aligned pilot control, which can remain stably aligned to the correct wavelength, via the pilot control, until the incoming signal exceeds $P_{min}$. This provides seamless interferometer performance during fades and reduces any interferometer induced acquisition delay.

Alternatively, the receiver can incorporate wavelength measurement of the incoming signal as a feedback parameter that can be used to send appropriate corrective information to the transmitter or the pilot references to optimize alignment with the stabilized receiver. This approach can be applied to stabilize and bias active interferometric modulators, such as Mach-Zehnder modulators (MZM).

Multiple pilot tones may also be employed according to an embodiment of the present invention. If the FSR is variable, pilot tones can be used to measure, with one or more used for stabilization, the other(s) used for probing. For a fixed FSR, multiple pilots that can be distinguished by wavelength of dither frequency can be precisely aligned to wavelength spacing that can be measured. Also, one pilot can operate as a spacing of approximately FSR/4 such that one operates at a contrast of D=1, which the other operates at a peak or trough (D=−1 or 1), so there is never a time when both pilot tones are aligned to the insensitive peak or trough region of the interferometer, thereby providing accuracy that is independent of interferometer bias.

Note that this method of controlling interferometers can be applied to any periodic interferometer, such as Mach-Zehnder or Michelson interferometers—either polarization independent or polarization dependent, fixed or variable-rate, as well as Sagnac and Fabry-Perot interferometers, as shown in FIGS. 16A and 16B.

Figure 15:
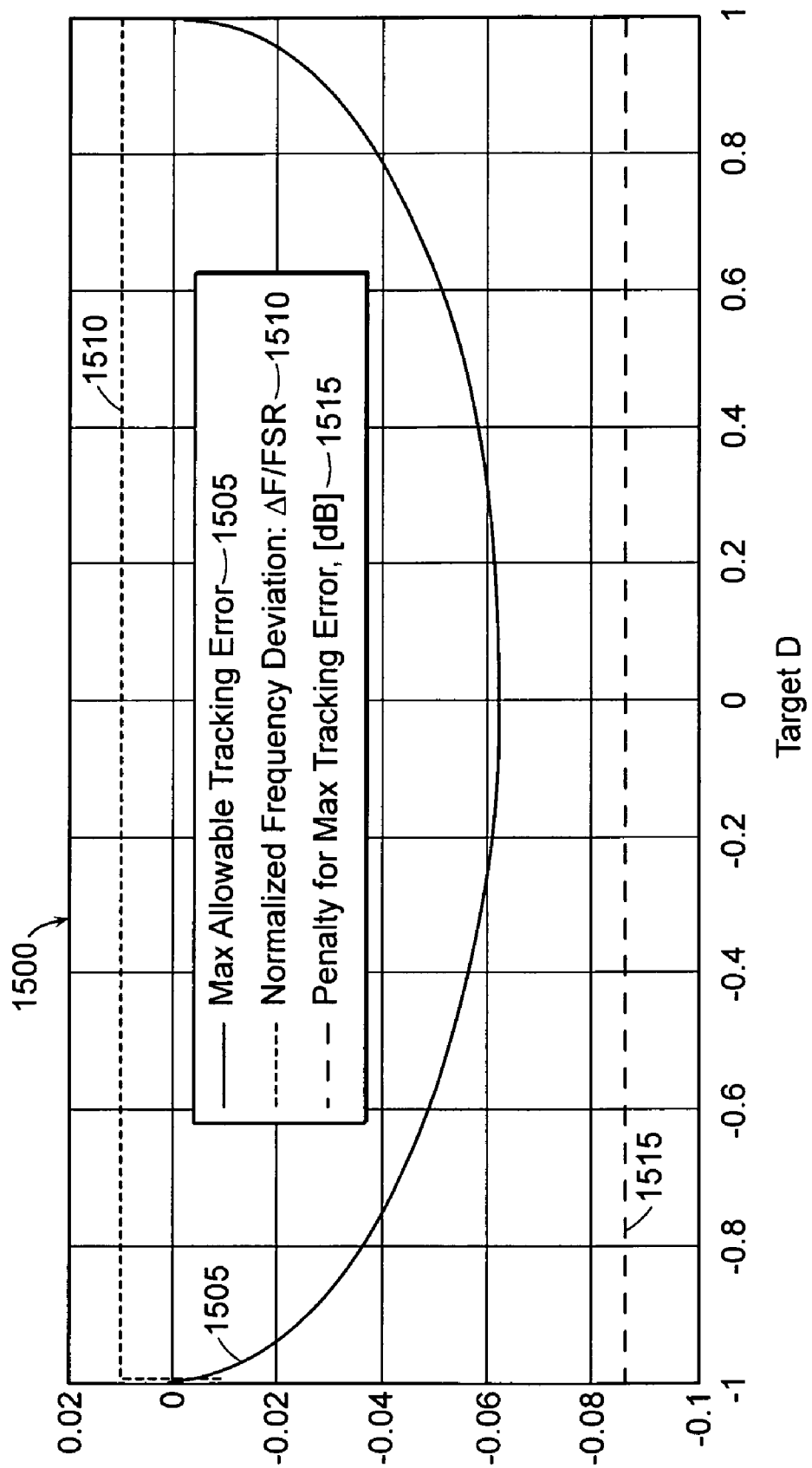
FIG. 15 is a plot illustrating tracking error and frequency deviation for a polarization independent interferometer according to an embodiment of the present invention.

FIG. 15 is a plot illustrating that the best place for pilot control occurs when the target D=equals zero since the sensitivity to frequency offsets is greatest at this location. This graph 1500 shows a trend in control margin as $D_{target}$. It turns out that for SNR penalty <−0.1 dB (e.g., less than 2%, corresponding to approximately 1% Δ F/FSR error), the $D_{target}$ can be within {−0.5 . . . 0.5} which is 50% of the FSR with a tracking error: Error:=|Dm−Dt|<0.05. Initial experiments show that over extended durations (e.g., approximately one day), pilot tracking can yield errors less than +/−0.05, consistent with a selection of $D_{target}$ over 50% of the FSR.

In the plot, a maximum allowable tracking error 1505 is indicated by a solid line, a normalized frequency deviation 1510 is indicated by a dotted line above the maximum allowable tracking error line 1505. And, a penalty for a maximum tracking error 1515 is indicated by a dashed line 1515 below the maximum allowable tracking error line 1505.

FIGS. 16A and 16B illustrate a transmission spectrum of a Fabry-Perot (interferometer) filter, showing a signal tone $\lambda_s$ and a pilot tone $\lambda_p$ aligned near another spectral mode. FIG. 16B illustrates blow-up of the Fabry-Perot transmission surrounding the pilot tone. The resulting discriminant or contrast is calculated as a ratio of a difference over a sum of the transmitted and reflected power.

Figure 17:
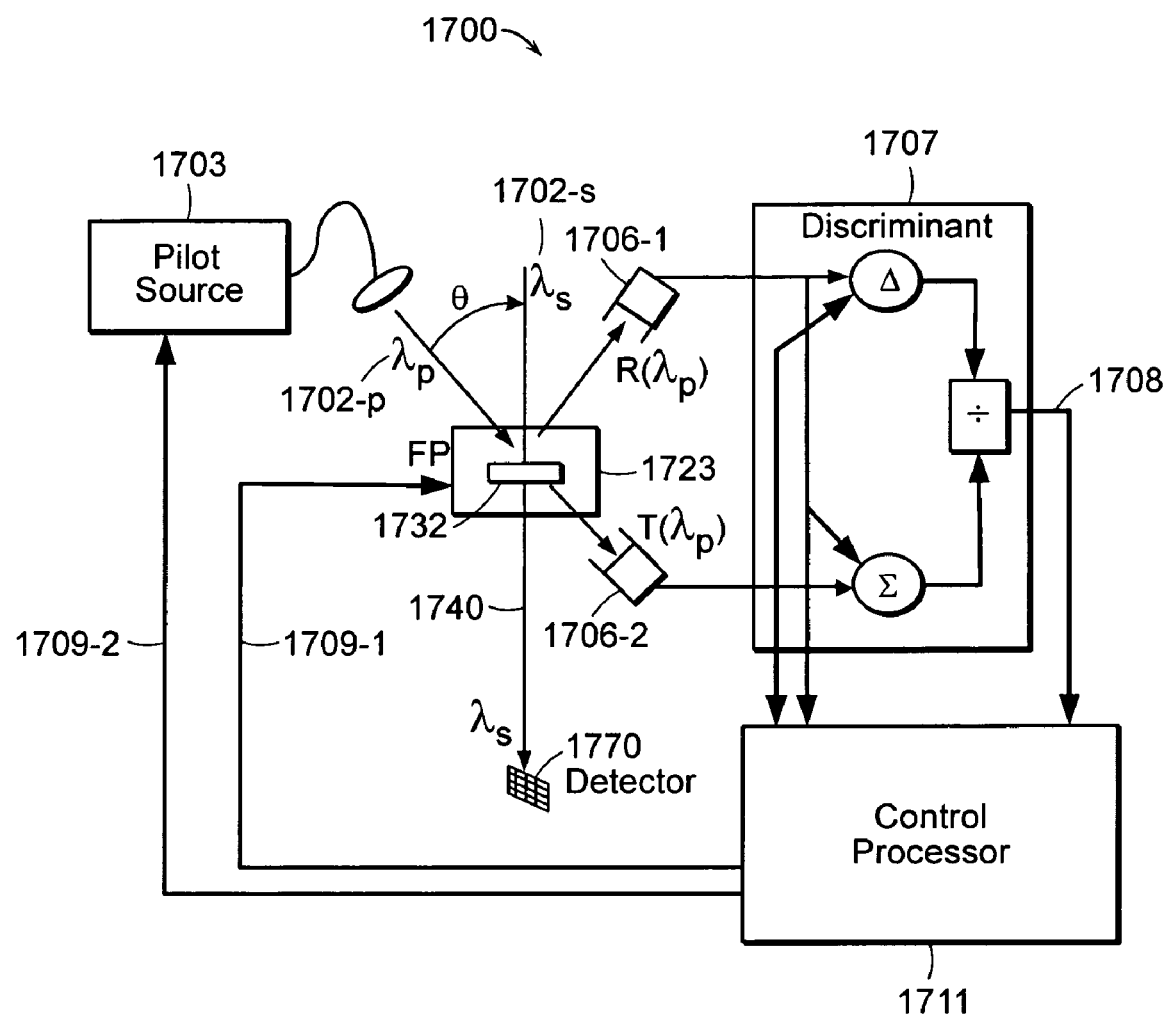
FIG. 17 is a schematic of a pilot tone-based control of a free-space Fabry-Perot (FP) interferometer.

FIG. 17 is a schematic of a pilot tone-based control of a free-space Fabry-Perot (FP) interferometer. A tunable CW pilot 1702-p produced by a tunable pilot tone source 1703 can be used to stabilize and control an entire comb of periodic FP filter modes in an absence of an optical signal 1702-s. The pilot tone 1702-p may be aligned to a remote fringe with knowledge of wavelength and angle offset from an expected signal target. A feedback discriminant (contrast) wherever 1708 is calculated by a discriminant processor 1707 from measurement of the pilot tone Tλ 1706-1 and Rλ 1706-2 Pilot/signal isolation can be achieved via angle, wavelength, direction, or polarization separation. In the embodiment of FIG. 17, a control processor 1711 creates feedback signals 1709-1 to control the Fabry-Perot interferometer 1732 for pilot feedback signal 1709-2 to adjust the pilot tone source 1703. The optical signal 1702-s travels through the Fabry-Perot interferometer 1732, which is contained in a protective housing 1723. The optical signal 1702-s travels via an optical path 1740 to an optical detector 1770, which is provided to the control processor for producing the feedback signal 1709-1.

The polarization independent interferometers (PII) described herein are especially well suited for use with pilot tone stabilization because they are fundamentally polarization and wavelength insensitive. Therefore, pilot tone can be effectively injected in a variety of locations with arbitrary polarization and with standard single-mode components. A secondary input to a Mach-Zehnder or PII interferometer is also a convenient place to insert the pilot tone since it does not require additional elements in the optical path.

In other embodiments, the pilot tone is locally resident or remote. With a locally resident pilot tone, interferometer control can be self-contained and signal-to-noise concerns, for instance, due to pilot attenuation over a link, are elevated. However, a remote pilot tone can be used to lock one or more interferometers precisely to the same wavelength reference, which may be useful in some network configurations.

Figure 18:
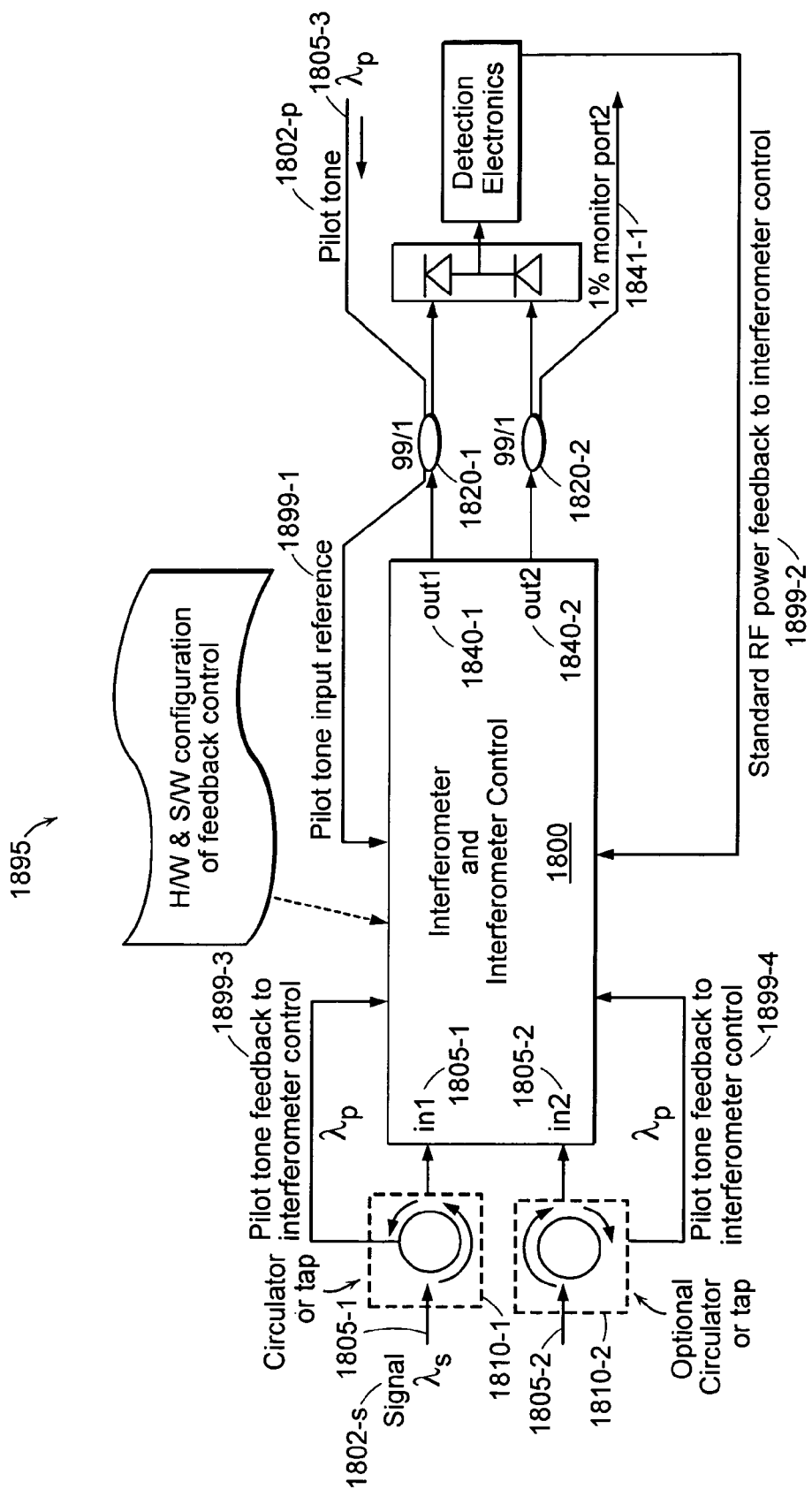
FIG. 18 is an embodiment of a receiver with pilot tone control in which the pilot tone is injected in the reverse direction at an input port.

FIG. 18 is another embodiment of a receiver 1895 utilizing a polarization independent interferometer and interferometer control 1800. In this embodiment, a pilot tone 1802-p is injected in the reverse direction at an input port 1805-3. The reverse direction is opposite to a direction of an optical signal 1802-s input at a first input port 1805-1 or another optical signal input at another optical input port 1805-2. By injecting the pilot tone 1802-p in the reverse direction, there is an elimination of a need for rejection filters, since, in this configuration, the pilot tone 1802p can be separated by propagation direction, allowing for more flexibility in selection of pilot tone wavelength. Thus, in this embodiment, the pilot tone can be the same as the signal wavelength if desired or convenient to implement. Alternatively, a combination of wavelength and direction or other discriminating means can be employed. Such approaches can potentially provide greater signal-pilot separation and/or be easier or more practical to implement.

In this embodiment, the pilot tone 1802-p passes through a 99/1 optical splitter 1820-1, and the pilot tone input reference 1899-1 is input to the interferometer 1800. At the same time, the optical signal 1802-s passes through the splitters 1820-1, 1820-2, and a standard RF power feedback 1899-2 can be provided to the interferometer 1800 for interferometer control. The pilot tone input reference 1899-1 further passes to the input ports 1805-1, 1805-2 of the interferometer 1800 and, via optional circulator or taps 1810-1, 1810-2, respectively, feeds back the pilot tone 1899-3 and 1899-4 to the interferometer 1800 to control the interferometer.

Figure 19A:
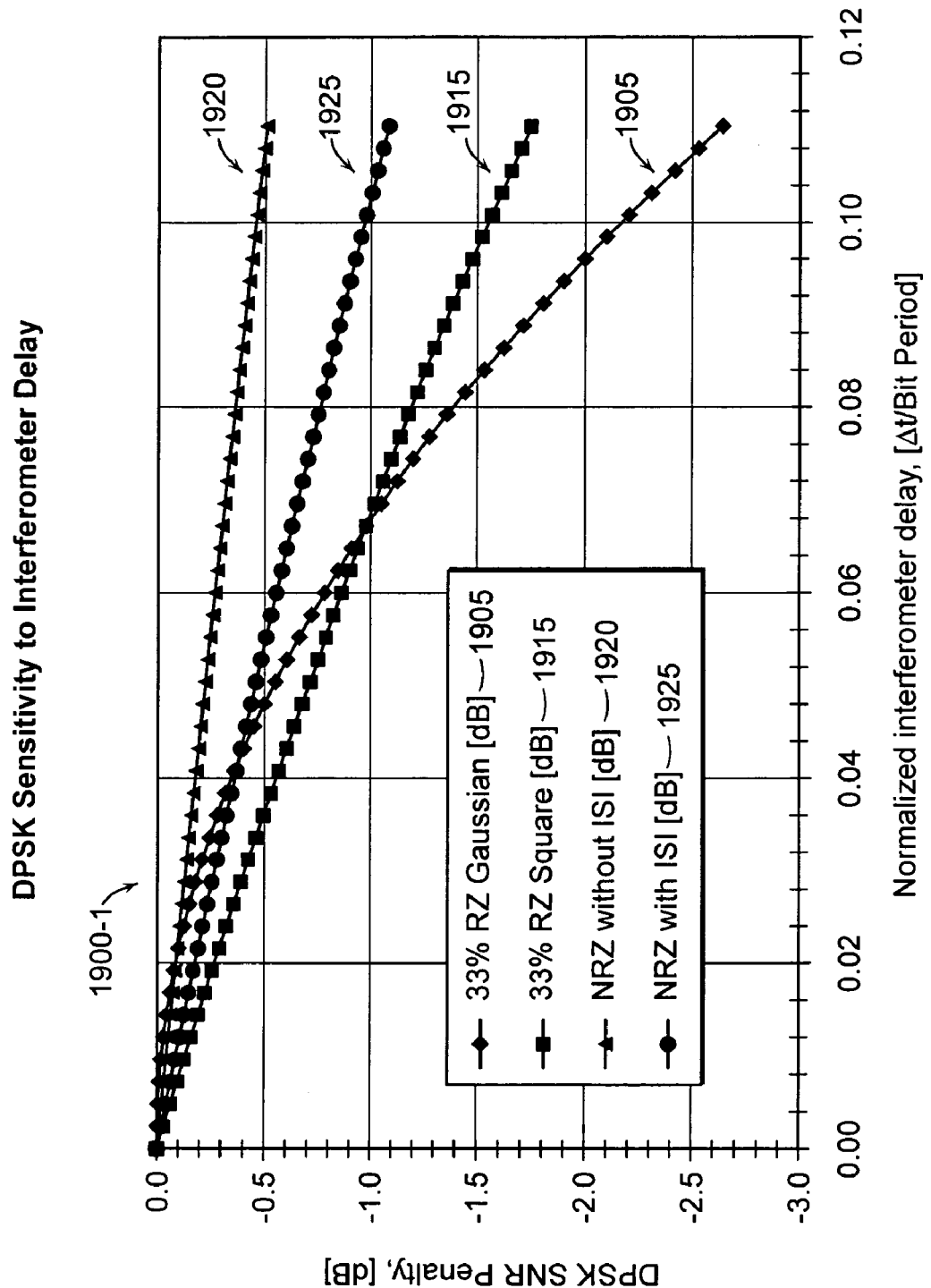
FIGS. 19A and 19B are graphs of DPSK sensitivity to interferometer delay, where the Y-axis is DPSK SNR penalty in dB, and the X-axis is measured in normalized interferometer delay in $\Delta t$/bit period.
Figure 19B:
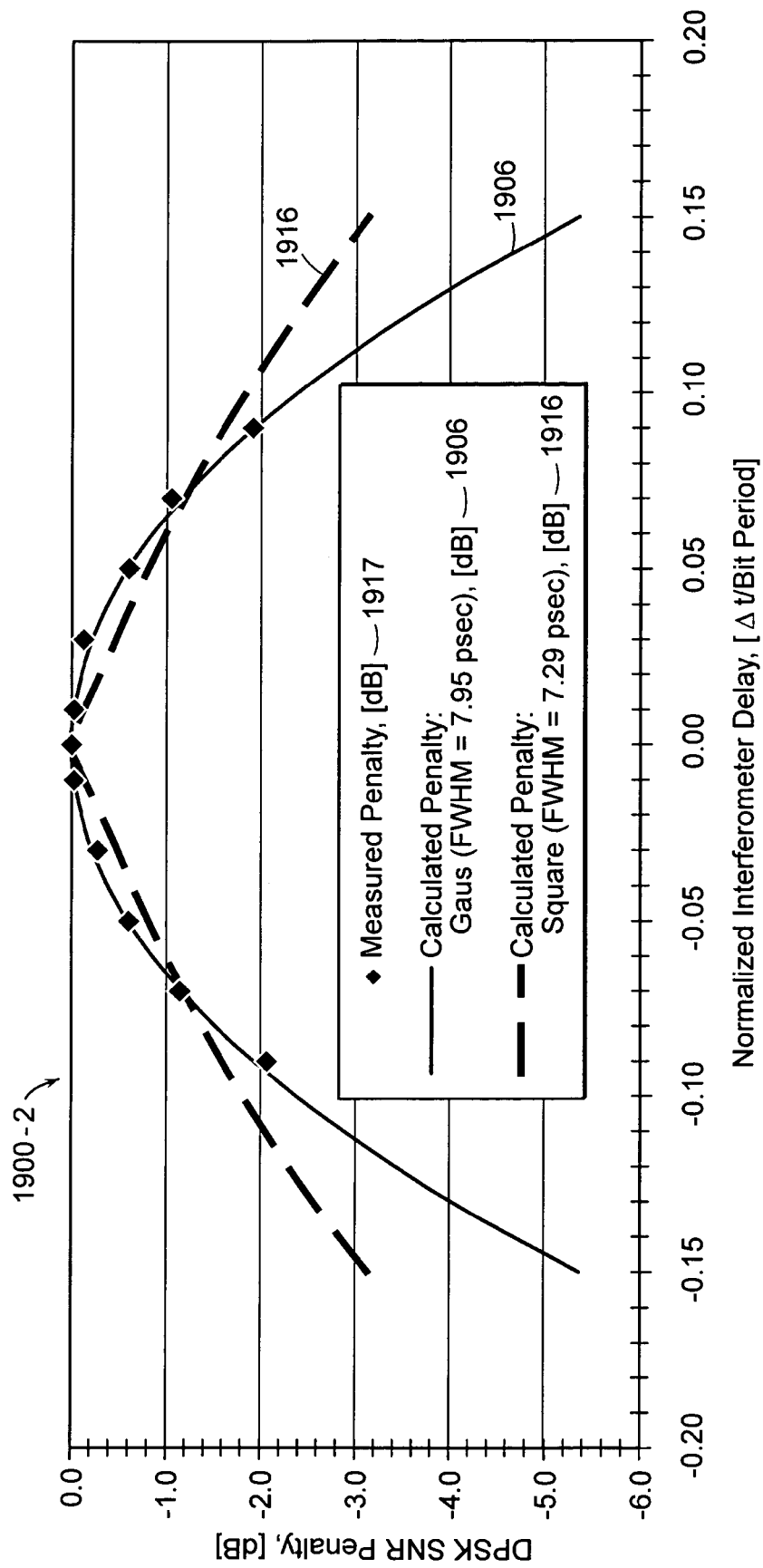

FIGS. 19A and 19B are graphs of DPSK sensitivity to interferometer delay, where the Y-axis is DPSK SNR penalty in dB, and the X-axis is measured in normalized interferometer delay in Δt/bit period. FIG. 19A illustrates DPSK sensitivity to interferometer delay for return-to-zero (RZ) Gaussian and square signals, and also Non-Return-to-Zero (NRZ) without and with Inter-Symbol-Interference (ISI). FIG. 19B illustrates DPSK sensitivity to interferometer delay for Gaussian and square waves of optical signals.

DPSK SNR penalties are incurred as the interferometer delay error (Δt) exceeds approximately 1% of the bit period (t) depending on the waveform. This is illustrated in FIG. 19A, which shows penalties for a 33% Gaussian RZ waveform 1905 33% Square −RZ waveform 1915, and NRZ waveforms 1920 and 1925 with and without Inter-Symbol Interference (ISI), respectively.

An interferometer with variable delay capability can be implemented according to embodiments of the present invention that: (i) can compensate such penalties which can arise due to manufacturing defects, aging, temperature, and changing data rates to name a few, and (ii) can estimate received pulse shape for diagnostics, without the need for a high-speed oscilloscope and/or data acquisition.

At 40 G bit/sec data rates (with a 25 psec period,) 1% corresponds to sub-picosecond delay-line accuracy in the interferometer, which can be a challenge to manufacture and maintain over a wide range of environmental conditions and extended 20+ year lifetime.

FIG. 19B illustrates the characterization capability for 40 G bit/sec (25 psec period), 33% Gaussian RZ waveforms using a variable-rate interferometer of the type described herein. Measured SNR penalty 1917—either measured directly, estimated based on bit-error rate, or other means, such as peak received power—as a function of normalized delay is shown along with calculated best-fit SNR penalties for the 33% Gaussian RZ waveform 1906 and Square—RF waveform 1916 with the fitting parameter being the waveform full-width-half-max (FWHM). The good match illustrated between the calculated Gaussian fit and the measured data provides an approximate 8 psec estimate of the waveform FWHM, in good agreement with an expected FWHM for a 40 GHz 33% Gaussian RZ waveform. An ability to measure such short wave forms even surpasses a capability of commercially available state-of-the-art 50+GHz oscilloscopes essentially performing an auto correlation of the waveform. Furthermore, as shown by the curve 1916, the 33% RZ Gaussian waveform is easily distinguished from the 33% square RZ waveform.

Thus, this type of characterization can be used to perform the following functions. First, it can be used to estimate waveform shape and FWHM (and report error conditions). A manufacturer can construct a single interferometer platform that can operate over of wide range of DPSK channel data rates (with high yield) or other applications with an ability to reconfigure and, with appropriate feedback, auto-calibrate to compensate for offsets. Second, this type of characterization can be used to determine the best interferometer delay for the incoming waveforms, thereby optimizing communications performance.

A Variable Rate, Differential Phase Shift Keying in (VR-DPSK) receiver (RX) with forward error correction (FEC) hardware, which is commonly used in telecommunications applications, can autonomously perform this type of characterization. This can be achieved without a need for extensive diagnostic hardware, since FEC can be used to measure Bit Error Rate (BER), which, in turn, can be used to estimate SNR. Therefore, a carrier or service provider that incorporates VR-DPSK RXs can deploy a common platform that can be remotely reconfigured to operate at different channel data rates or compensate for degradation. In addition, once deployed, VR-DPSK RXs can be used to provide point-to-point and network wide waveform diagnostics and quality assessment, which can aid in trouble-shooting channel conditions (e.g., excessive dispersion or nonlinearities) or transmitter performance. Such measurements can be used for feedback on the network level and to reconfigure the VR-interferometer to provide best performance.

Combining a VR-DPSK RX with a multi-channel DPSK RX, such as described in U.S. patent application Ser. No. 11/022,344, entitled multi-channel DPSK receiver, by David O. Caplan, filed Dec. 23, 2004, the entire teachings of which are incorporated herein by reference) facilitates redundancy in high-reliability applications, such as wide-band long hall undersea or space-based platforms. This can be achieved, for instance, by including a redundant VR-DPSK RX and a functional received terminal. The operational multi-channel VR-DPSK RX can self-optimize or auto-calibrate as described above, and potentially include some internal backup mechanisms for robustness; but, in event of catastrophic failure, a single backup VR-DPSK RX can be switched in and provide full and flexible functionality, in accordance with an embodiment of the present invention. Using conventional backup approaches using static single-channel DPSK interferometer receivers full redundancy requires backup interferometers for each channel (i.e., an 80 channel WDM system requires 80 spare interferometers), which may be prohibitively expensive, especially without an ability to auto-calibrate or reconfigure to accommodate future needs.

Figure 20:
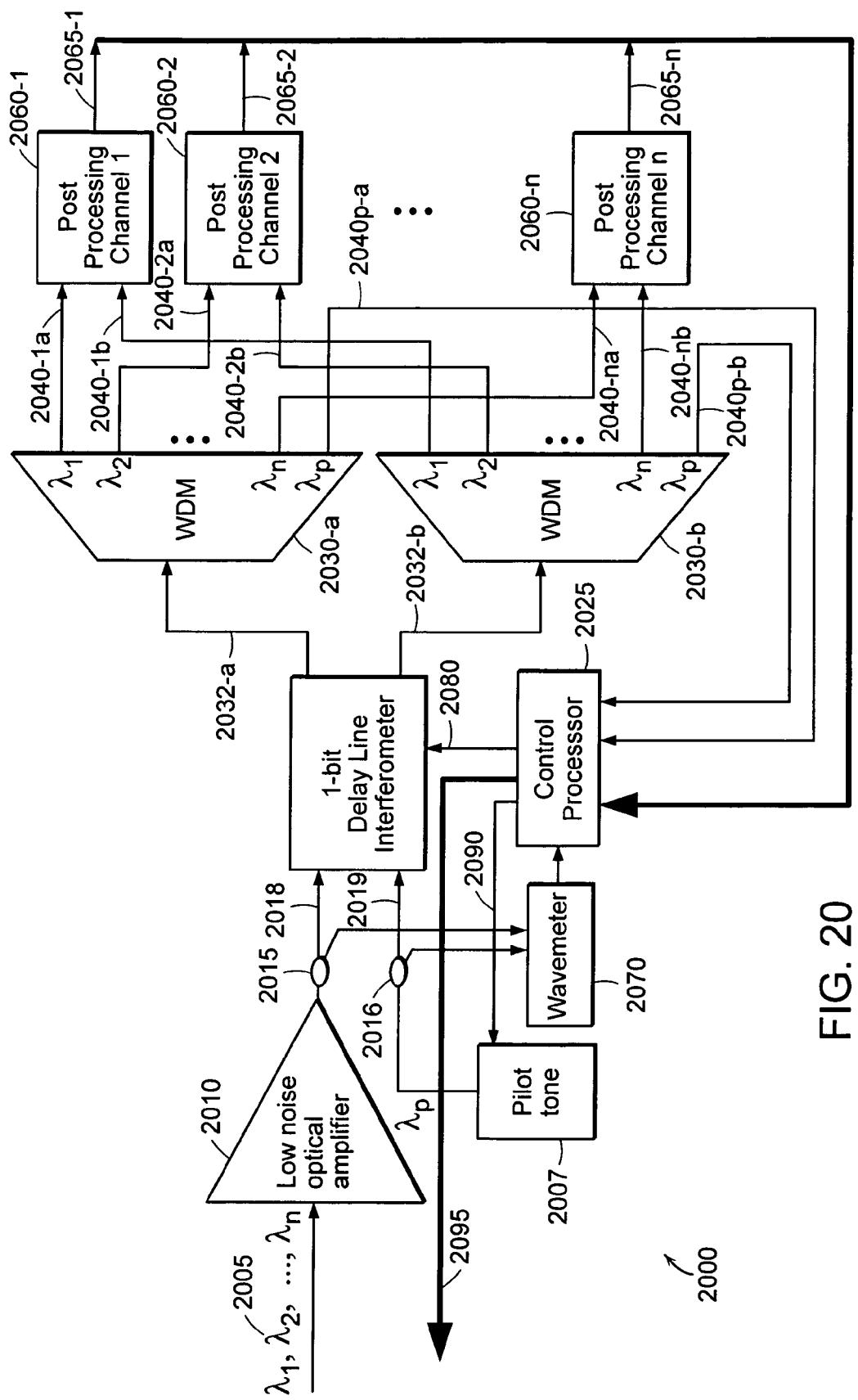
FIG. 20 is a schematic diagram of a receiver employing pilot tone control.

FIG. 20 is a schematic diagram of an example embodiment of an optical, multi-channel, DPSK receiver 2000 according to an embodiment of the present invention. The receiver 2000 receives optical signal(s) 2005 from optical transmitter(s) (not shown). The optical signal(s) 2005 may have many DPSK channels defined by distinct wavelengths, $\lambda_1, \lambda_2, \ldots, \lambda_n$. In one embodiment, the optical signal(s) 105 are received by an optical amplifier 2010, such as a low noise Erbium Doped Fiber Amplifier (EDFA) 2010, which may be separate from the receiver 2000 or integrated into the receiver 2000. The EDFA 2010 outputs amplified optical signal(s) 2005 to a first optical splitter 2015, which directs a portion of the amplified optical signal(s) 2005 to an interferometer 2020, such as a 1-bit delay line interferometer 2020, via a primary input line 2018. The delay line interferometer 2020 is sometimes referred to as a "delay and multiply demodulator." The remaining portion of the amplified optical signal(s) 2005 is directed to a wavemeter 2070. The receiver 2000 may leverage the periodic transfer functions ($\cos^2$ or $\sin^2$) from either arm of the interferometer 2020 to perform a delay line (e.g., one bit) demodulation on all channels ($\lambda$'s) with a single interferometer. Such leveraging is preferably performed by defining the wavelength spacing ($\Delta v_{ch}$) to be an integer multiple of a channel rate (R).

$$\Delta v_{ch} = mR, \tag{Equation 1}$$

where m is a positive integer.

The interferometer 2020 demodulates the optical signal(s) 2005 by interfering the received optical signal pulses from each channel with an offset version of itself, where the offset is equal to the interferometer delay. The delay is usually a one bit delay (i.e., interfering adjacent signal pulses), but more generally can be an integer multiple of the one bit delay duration (i.e., interfering non-adjacent pulses). The interference converts the optical signal in each channel from being differentially phase modulated to being intensity modulated. An example of an interferometer that may be used in the receiver 2000 is described above in reference to FIG. 1C, for example.

Continuing to refer to FIG. 20, the interferometer 2020 outputs a processed form of the optical signal(s) 2005 onto first and second main optical paths 2032-a and 2032-b, respectively (collectively, optical paths 2032). The demodulated optical signal(s) on the two main optical paths 2032 are complementary; if the optical signal pulses in each channel constructively interfere (i.e., they are in-phase), the interferometer 2020 directs the phase demodulated optical signals onto one main optical path (2032-a), and if the optical signal pulses destructively interfere (i.e., they are out-of-phase), the interferometer 2020 directs the phase demodulated optical signal onto the other main optical path (2032-b).

The optical paths 2032 traverse a channel selector network 2030 shown as 1×(n+1) Wavelength Division de-Multiplexers (WDMs) 2030-a, 2030-b (collectively 2030) (e.g., prisms, diffraction gratings, or Arrayed Waveguide Gratings (AWGs) in FIG. 20, or alternatively defined by a series of cascaded fiber Bragg grating (FBG) WDM filter pairs). The WDMs 2030 or filter pairs (not shown) are coupled to respective tributary optical paths 2040-1a/2040-1b, 2040-2a/2040-2b, ..., 2040-na/2040-nb (collectively, tributary optical paths 2040).

The tributary paths for each channel are sent to post processing elements 2060, which may be all optical, or optoelectronic, which includes elements such as communications electronics (not shown), balanced detection hardware (not shown), and detection electronics (not shown). The communications electronics pass network traffic to network communications systems. The detection electronics may include peak RF power detection (for signal-to-interferometer alignment), clock recovery, Forward Error Correction (FEC) decoding hardware, and so forth. As shown in FIG. 1A, each of the post processing elements 2060-1, 2060-2, ..., 2060-n, (collectively 2060) may send channel performance information or metrics, such as Bit Error Rate (BER) and peak RF power, to a control processor 2025 via bus lines 2065-1, 2065-2, ..., 2065-n (collectively 2065). Other inputs to the control processor 2025 may include measurements by a wavemeter 2070 of a pilot tone $\lambda_p$ and incoming optical signal(s) wavelength information, which can be used along with the BER and peak RF power, among other information or metrics, to determine feedback signal(s) (not shown). The feedback signals are communicated from the control processor 2025 to the pilot tone generator 2007 and optical transmitter(s) (not shown) via feedback paths 2090 and 2095, respectively. The feedback signals are generated to control the pilot tone $\lambda_p$ and incoming received signal wavelengths, respectively.

For control purposes, an optical pilot tone generator 2007 generates an optical pilot or reference tone $\lambda_p$ that may be injected into the interferometer 2020 via a secondary input line 2080 at an output of a second optical splitter 2016. A portion of the pilot tone $\lambda_p$ may also be directed via the optical splitter 2016 to the wavemeter 2070 for wavelength measurement. Pilot tone outputs from the interferometer 2020 are directed through the channel selector network 2030. The a-side and b-side WDM pilot tone outputs on tributary optical paths 2040p-a and 2040p-b, respectively (collectively 2040p), are directed to the control processor 2025, which may measure a contrast between the pilot tone outputs on tributary optical paths 2040p. The measured contrast (D), which is the normalized difference between the pilot tone outputs on the tributary optical paths 2040p:

$$D=(2040p\text{-}a-2040p\text{-}b)/(2040p\text{-}a+2040p\text{-}b),$$

is a function of the pilot tone wavelength $\lambda_p$ (or equivalently center frequency) and the interferometer bias (e.g., interferometer phase), which is discussed in further detail below in U.S. application Ser. No. 11/022,344, filed Dec. 23, 2004, entitled "Multi-Channel DPSK Receiver," the entire teachings of which are incorporated herein. For a given pilot tone wavelength, which may either be known or measured, the pilot tone contrast ratio is a function of the interferometer bias. Therefore, sending pilot tone outputs on the tributary optical paths 2040p to the control processor 2025 enables the pilot contrast to be determined, which can provide feedback parameters that may be used to measure and the control interferometer 2020, as discussed above.

While this invention has been particularly shown and described with references to preferred embodiments thereof, it will be understood by those skilled in the art that various changes in form and details may be made therein without departing from the scope of the invention encompassed by the appended claims.

What is claimed is:

1. An interferometer, comprising:
   an optical insertion element receiving at least one optical signal;
   a splitter optically coupled to the insertion element that splits the at least one optical signal in a forward direction onto multiple optical paths and interferes the optical signal in a reverse direction from the multiple optical paths;
   at least one direction changing element coupled to the splitter by respective optical paths causing the optical signal to travel in the reverse direction on the respective optical paths;
   a polarization rotation element in at least one of the multiple optical paths configured to rotate the optical signal to a polarization in the reverse direction orthogonal to the polarization in the forward direction; and
   a given optical element, in at least one of the multiple optical paths, configured to apply an optical function to the at least one optical signal other than a delay corresponding to a fraction of a carrier wavelength of the at least one optical signal.

2. The interferometer according to claim 1 wherein the given optical element is a delay element that adds a path delay of at least one psec.

3. The interferometer according to claim 1 further including a microscopic delay element that delays the optical signal passing therethrough with a resolution of a fraction of a carrier wavelength of the optical signal.

4. The interferometer according to claim 1 wherein the optical insertion element, splitter, and optical element are single-mode optical elements.

5. The interferometer according to claim 1 wherein the given optical element introduces a dither into a respective optical path.

6. The interferometer according to claim 1 further including an element other than the given optical element that introduces a dither into at least one of the multiple optical paths.

7. The interferometer according to claim 1 wherein the given optical element causes a gain or loss to the optical signal on the respective optical path.

8. The interferometer according to claim 1 wherein the given optical element selectably terminates the interference.

9. The interferometer according to claim 1 further including a processor that causes the given optical element to terminate the interference, characterizes elements in the interferometer, and calibrates the interferometer through use of the at least one reconfigurable, macroscopic, optical element.

10. The interferometer according to claim 1 wherein the optical signal is a differential phase shift keying (DPSK) signal.

11. The interferometer according to claim 1 wherein the given optical element includes at least one of the following elements in at least one of the multiple optical paths: an amplifier, attenuator, band-pass filter, band-reject filter, notch filter, comb filter, pulse shaper, specialty fiber, nonlinear optical element, dispersion compensating element, direction independent modulator, direction dependent modulator, optical delay element, optical switch, wavelength converter, pump coupling element, interleaver, or wavelength division multiplexer.

12. The interferometer according to claim 1 wherein the at least one direction changing element and polarization rotation element form a Faraday mirror.

13. The interferometer according to claim 12 wherein the given optical element includes an optical gain medium in the multiple optical paths, the multiple optical paths between the Faraday mirror and optical gain medium being loss insensitive regions, wherein the given optical element is disposed in respective loss insensitive regions.

14. The interferometer according to claim 1 wherein the at least one direction changing element and the polarization rotation element are the same element.

15. The interferometer according to claim 1 further including a device under test optically disposed in at least one of the multiple optical paths.

16. The interferometer according to claim 1 wherein the given optical element includes an optical switching element.

17. The interferometer according to claim 1 further including another splitter configuring another interferometer in at least one of the optical paths.

18. The interferometer according to claim 1 wherein the optical insertion element is a beam splitter, polarization beam splitter, or circulator.

19. The interferometer according to claim 1 further including an optical detector coupled to outputs of the interferometer and a controller causing the given optical element to be reconfigured based on optical signals detected by the optical detector.

20. The interferometer according to claim 1 wherein the interferometer interferes orthogonally polarized, differentially encoded light.

21. The interferometer according to claim 1 further including a tuner that causes the interferometer to tune to the at least one optical signal or a different received optical signal.

22. The interferometer according to claim 21 wherein at least one of the optical signals is a carrier wavelength, a pilot tone, or plurality of pilot tones.

23. The interferometer according to claim 1 wherein the given optical element is adjustable in a manner accommodating multiple lengths of overhead or payload or data rates of optical DPSK signals.

24. A method of interfering optical signals, the method comprising:
    splitting at least one optical signal onto multiple optical paths in a forward direction;
    causing the at least one optical signal to travel in a reverse direction on the respective multiple optical paths;
    polarization rotating the optical signal in at least one of the multiple optical paths to a polarization in the reverse direction orthogonal to the polarization in the forward direction;
    applying a function to the at least one optical signal, other than delaying the optical signal by a fraction of a carrier wavelength of the at least one optical signal, by passing the at least one optical signal through a given optical element in at least one of the multiple optical paths;
    interfering the optical signal traveling in the reverse direction on the multiple optical paths with each other.

25. The method according to claim 24 wherein applying the function includes delaying the at least one optical signal by at least one psec.

26. The method according to claim 25 further including delaying the at least one optical signal on at least one of the multiple optical paths by a fraction of a carrier wavelength.

27. The method according to claim 24 further including introducing a dither into at least one of the multiple optical paths.

28. The method according to claim 24 applying the function includes causing a gain or loss to the optical signal on at least one of the multiple optical paths.

29. The method according to claim 24 wherein applying the function includes selectably terminating the interfering of optical signals.

30. The method according to claim 24 further including automatically characterizing optical elements applying the function to the at least one optical signal in at least one of the multiple optical paths; and automatically calibrating the given optical elements based on results of the characterizing.

31. The method according to claim 24 wherein the at least one optical signal is a differential phase shift keying (DPSK) optical signal.

32. The method according to claim 24 wherein applying the function includes applying at least one of the following optical functions to the at least one of the optical signals on at least one of the multiple optical paths:
    amplifying, attenuating, band-pass filtering, band-reject filtering, notch filtering, comb-filtering, pulse shaping, passing the optical signal through a specialty fiber, affecting the optical signal on at least one of the multiple optical paths in a nonlinear manner, dispersion compensating, direction independent modulating, direction dependent modulating, optically delaying, optically switching, wavelength converting, pump coupling, interleaving, or wavelength division multiplexing.

33. The method according to claim 24 wherein causing the optical signal to travel in a reverse direction includes rotating the polarity of the at least one optical signal on the respective multiple optical paths through use of a Faraday mirror and wherein applying the function includes causing a gain to the at least one optical signal on the multiple optical paths at a given location wherein applying the function to the at least one optical signal on the multiple optical paths occurs in a loss insensitive region between to the Faraday mirror and the given location.

34. The method according to claim 24 wherein causing the at least one optical signal to travel in the reverse direction and polarization rotating the at least one optical signal is performed by the same optical element.

35. The method according to claim 24 further including exposing a device under test in at least one of the optical paths to the at least one optical signal in the respective optical path.

36. The method according to claim 24 further including optically switching the at least one optical signal in at least one of the multiple paths.

37. The method according to claim 24 further including splitting or interfering the optical signal in at least one of the multiple optical paths.

38. The method according to claim 24 further including splitting, causing direction reversal, polarization rotating, applying the function, and interfering the at least one optical signal on at least one of the multiple paths.

39. The method according to claim 24 further including inserting the optical signal, for splitting onto multiple optical paths, by beam splitting, polarization beam splitting, or circulating the at least one optical signal.

40. The method according to claim 24 further including detecting the at least one optical signal traveling in the reverse direction from the multiple optical paths.

41. The method according to claim 24 wherein interfering the optical signal on the multiple optical paths includes interfering orthogonally polarized, differentially encoded light.

42. The method according to claim 24 further including tuning the interference based on the at least one optical signal or a different optical signal.

43. The method according to claim 42 wherein at least one of the optical signals includes a carrier wavelength, a pilot tone, or a plurality of pilot tones.

44. The method according to claim 24 wherein applying the function to the at least one optical signal in at least one of the multiple optical paths includes accommodating multiple lengths of overhead or payload or data rates of optical DPSK signals.

45. A double-pass interferometer, comprising:
    means for rotating polarization of an optical signal in at least one of multiple optical paths to a polarization in a reverse direction orthogonal to the polarization in a forward direction in the at least one of multiple optical paths; and
    means for applying a function to the optical signal, other than delaying the optical signal by a fraction of a carrier wavelength of the optical signal, in at least one of the multiple optical paths.

* * * * *